(12) United States Patent
Beele

(10) Patent No.: US 10,422,427 B2
(45) Date of Patent: Sep. 24, 2019

(54) ASSEMBLY AND A METHOD FOR PROVIDING IN AN OPENING SEALING SYSTEM

(75) Inventor: Johannes Alfred Beele, Aalten (NL)

(73) Assignee: Beele Engineering B.V., Aalten (NL)

(*) Notice: Subject to any disclaimer, the term of this patent is extended or adjusted under 35 U.S.C. 154(b) by 532 days.

(21) Appl. No.: 13/699,189

(22) PCT Filed: Dec. 30, 2010

(86) PCT No.: PCT/EP2010/070921
§ 371 (c)(1),
(2), (4) Date: Jan. 15, 2013

(87) PCT Pub. No.: WO2011/147490
PCT Pub. Date: Dec. 1, 2011

(65) Prior Publication Data
US 2013/0106060 A1  May 2, 2013

(30) Foreign Application Priority Data

May 25, 2010 (EP) .................................. 10163749

(51) Int. Cl.
*H02G 3/22* (2006.01)
*F16J 15/02* (2006.01)
(Continued)

(52) U.S. Cl.
CPC .............. *F16J 15/02* (2013.01); *F16L 5/10* (2013.01); *F16L 5/14* (2013.01); *F16L 7/02* (2013.01); *H02G 3/22* (2013.01)

(58) Field of Classification Search
CPC .. H02G 3/22; H02G 3/24; H02G 3/26; H02G 3/30; H02G 3/36; H01R 13/52;
(Continued)

(56) References Cited

U.S. PATENT DOCUMENTS 2,032,492 A  3/1936  Nathan
2,202,617 A  5/1940  Shook
(Continued)

FOREIGN PATENT DOCUMENTS

CA  2 325 183 A1  5/2001
CN  1147294 A  4/1997
(Continued)

OTHER PUBLICATIONS

International Search Report and Written Opinion dated Oct. 1, 2013 for Application No. PCT/EP2013/067891.
(Continued)

*Primary Examiner* — Angel R Estrada
(74) *Attorney, Agent, or Firm* — Wolf, Greenfield & Sacks, P.C.

(57) ABSTRACT

A sealing assembly for providing in an opening a sealing through which at least one cable, pipe or duct extends is disclosed. The assembly includes a transit-unit of a relatively inflexible material, wherein the transit-unit comprises one or a plurality of conduits extending in a longitudinal direction of the transit-unit. Each conduit is suitable for receiving at least one of the at least one cable, pipe or duct. A method for providing in an opening a sealing system through which at least one cable, pipe or duct extends is disclosed. The method includes providing a transit-unit of a relatively inflexible material, wherein the transit-unit comprises one or a plurality of conduits extending in a longitudinal direction of the transit-unit. Each conduit is suitable for receiving at least one of the at least one cable, pipe or duct.

21 Claims, 15 Drawing Sheets

(51) Int. Cl.
*F16L 5/10* (2006.01)
*F16L 5/14* (2006.01)
*F16L 7/02* (2006.01)

(58) Field of Classification Search
CPC ............ H01R 13/5202; H01R 13/5205; H01R 13/521; F16L 5/02; F16L 5/00
USPC .............. 174/152 G, 650, 72 A, 135, 152 R, 174/153 G, 652, 659; 16/2.1, 2.2; 248/56, 49; 277/314, 312
See application file for complete search history.

(56) References Cited

U.S. PATENT DOCUMENTS

| | | |
|---|---|---|
| 2,271,777 A | 2/1942 | Nathan |
| 2,354,919 A | 8/1944 | Elmer |
| 2,355,742 A | 8/1944 | Morehouse |
| 2,396,836 A | 3/1946 | Ellinwood |
| 2,404,531 A | 7/1946 | Robertson |
| 2,419,018 A | 4/1947 | Gudie |
| 2,448,769 A | 9/1948 | Chamberlain |
| 2,819,099 A | 1/1958 | Rittle |
| 2,896,974 A | 7/1959 | Bush |
| 3,016,722 A | 1/1962 | Batdorf |
| 3,048,415 A | 8/1962 | Shook |
| 3,067,425 A | 12/1962 | Colley |
| 3,162,412 A | 12/1964 | McEntire |
| 3,163,448 A | 12/1964 | Carl |
| 3,165,324 A | 1/1965 | Zopfi |
| 3,206,539 A | 9/1965 | Kelly |
| 3,229,026 A | 1/1966 | Sulzer |
| 3,331,914 A | 7/1967 | Kavinsky |
| 3,352,212 A | 11/1967 | Read |
| 3,489,440 A | 1/1970 | Brattberg |
| 3,578,027 A | 5/1971 | Zopfi |
| 3,580,988 A | 5/1971 | Orlowski et al. |
| 3,702,193 A | 11/1972 | Flegel et al. |
| 3,727,172 A | 4/1973 | Clark |
| 3,731,448 A | 5/1973 | Leo |
| 3,793,672 A | 2/1974 | Wetmore |
| 3,811,711 A | 5/1974 | Tarkenton |
| 3,827,704 A | 8/1974 | Gillemot et al. |
| 3,893,919 A | 7/1975 | Flegel et al. |
| 3,913,928 A | 10/1975 | Yamaguchi |
| 4,061,344 A | 12/1977 | Bradley et al. |
| 4,075,803 A | 2/1978 | Alesi |
| 4,086,736 A | 5/1978 | Landrigan |
| 4,245,445 A | 1/1981 | Heinen |
| 4,293,138 A | 10/1981 | Swantee |
| 4,361,721 A | 11/1982 | Massey |
| 4,376,230 A | 3/1983 | Bargsten |
| 4,385,777 A | 5/1983 | Logsdon |
| 4,413,845 A | 11/1983 | Lawrence |
| 4,419,535 A | 12/1983 | O'Hara |
| 4,426,095 A | 1/1984 | Buttner |
| 4,429,886 A | 2/1984 | Buttner |
| 4,641,858 A | 2/1987 | Roux |
| 4,664,421 A | 5/1987 | Jones |
| 4,797,122 A | 1/1989 | Kuboi et al. |
| 4,889,298 A | 12/1989 | Hauff |
| 4,915,422 A | 4/1990 | Chacon et al. |
| 4,919,372 A * | 4/1990 | Twist ..................... H02G 3/22 248/56 |
| 4,998,896 A | 3/1991 | Lundergan |
| 5,020,810 A | 6/1991 | Jobe |
| 5,027,571 A | 7/1991 | Wolff |
| 5,067,676 A | 11/1991 | Beele |
| 5,108,060 A * | 4/1992 | Beele ..................... H02G 3/22 248/56 |
| 5,245,131 A | 9/1993 | Golden et al. |
| 5,288,087 A | 2/1994 | Bertoldo |
| 5,344,106 A | 9/1994 | Beele |
| 5,377,939 A | 1/1995 | Kirma |
| 5,456,050 A | 10/1995 | Ward |
| 5,482,076 A | 1/1996 | Taylor et al. |
| 5,493,068 A | 2/1996 | Klein et al. |
| 5,611,706 A | 3/1997 | Makita et al. |
| 5,649,712 A | 7/1997 | Ekholm |
| 5,653,452 A | 8/1997 | Jarvenkyla |
| 5,662,336 A | 9/1997 | Hayashi |
| 5,927,725 A | 7/1999 | Masaaki et al. |
| 5,954,345 A | 9/1999 | Svoboda et al. |
| 6,180,882 B1 | 1/2001 | Dinh |
| 6,259,033 B1 | 7/2001 | Kassulat |
| 6,343,412 B1 | 2/2002 | Stephenson |
| 6,359,224 B1 | 3/2002 | Beele |
| 6,431,215 B1 | 8/2002 | Hsu |
| 6,494,463 B1 | 12/2002 | Rank |
| 6,521,840 B1 | 2/2003 | Kreutz |
| 6,575,430 B1 | 6/2003 | Smith |
| 6,634,675 B2 | 10/2003 | Parkes |
| 6,717,055 B2 * | 4/2004 | Kato ..................... H02G 3/32 174/72 A |
| 6,862,852 B1 | 3/2005 | Beele |
| 6,902,138 B2 | 6/2005 | Vantouroux |
| 6,969,799 B2 | 11/2005 | Snyder |
| 7,005,579 B2 * | 2/2006 | Beele ..................... H02G 3/22 16/2.1 |
| 7,186,929 B2 * | 3/2007 | Cox ..................... H02G 3/088 16/2.1 |
| 7,249,971 B2 | 7/2007 | Burke et al. |
| 7,288,730 B2 | 10/2007 | Habel et al. |
| 7,299,823 B2 | 11/2007 | Smith |
| 7,371,969 B2 | 5/2008 | Hedstrom |
| 7,410,174 B2 | 8/2008 | Jones et al. |
| 7,442,884 B2 * | 10/2008 | Ball ..................... H02G 15/013 16/2.1 |
| 7,534,965 B1 * | 5/2009 | Thompson ............... H02G 3/22 16/2.1 |
| 7,781,684 B2 | 8/2010 | Stuckmann et al. |
| 7,802,798 B2 | 9/2010 | Beele |
| 7,806,374 B1 | 10/2010 | Ehmann et al. |
| 7,918,486 B2 * | 4/2011 | Preisendorfer ........ F16L 41/088 285/136.1 |
| 8,262,094 B2 | 9/2012 | Beele |
| 8,490,353 B2 | 7/2013 | Beele |
| 8,541,698 B2 | 9/2013 | Perschon et al. |
| 8,833,014 B2 * | 9/2014 | Beele ..................... H02G 3/22 277/607 |
| 9,528,636 B2 | 12/2016 | Beele |
| 9,722,404 B2 | 8/2017 | Beele |
| 2002/0171207 A1 | 11/2002 | Torii |
| 2004/0045233 A1 | 3/2004 | Beele |
| 2004/0093814 A1 | 5/2004 | Cordts et al. |
| 2004/0093815 A1 | 5/2004 | Cordts |
| 2004/0168398 A1 | 9/2004 | Sakno et al. |
| 2004/0231880 A1 | 11/2004 | Beele |
| 2005/0179214 A1 | 8/2005 | Beele |
| 2006/0053710 A1 | 3/2006 | Miller et al. |
| 2007/0216110 A1 | 9/2007 | Stuckmann et al. |
| 2007/0273107 A1 | 11/2007 | Beele |
| 2008/0088128 A1 | 4/2008 | Staskal |
| 2009/0130891 A1 | 5/2009 | Milton |
| 2009/0218451 A1 | 9/2009 | Lundborg |
| 2009/0315275 A1 | 12/2009 | Beele |
| 2010/0059941 A1 | 3/2010 | Beele |
| 2010/0326724 A1 | 12/2010 | Karlsson et al. |
| 2011/0018210 A1 | 1/2011 | Beele |
| 2013/0161913 A1 | 6/2013 | Beele |
| 2013/0234405 A1 | 9/2013 | Beele |
| 2015/0292649 A1 | 10/2015 | Beele |
| 2016/0020592 A1 | 1/2016 | Beele |

FOREIGN PATENT DOCUMENTS

| | | |
|---|---|---|
| CN | 1205068 A | 1/1999 |
| CN | 1286366 A | 3/2001 |
| CN | 1781001 A | 5/2006 |
| CN | 101506565 A | 8/2009 |
| DE | 2 203 370 | 8/1973 |
| DE | 34 43 284 A1 | 5/1986 |
| DE | 92 04 067 U1 | 7/1992 |

(56) References Cited

FOREIGN PATENT DOCUMENTS

| | | |
|---|---|---|
| DE | 92 06 312 U1 | 8/1992 |
| DE | 42 25 916 A1 | 2/1994 |
| DE | 200 02 216 U1 | 4/2000 |
| DE | 296 05 883 U1 | 5/2001 |
| DE | 201 03 786 U1 | 8/2001 |
| DE | 100 35 006 C1 | 3/2002 |
| DE | 202004017185 U1 | 3/2006 |
| DE | 102005002597 B3 | 8/2006 |
| DE | 20 2006 017 659 U1 | 8/2007 |
| DE | 20 2009 004 739 U1 | 7/2009 |
| EP | 0 102 876 A2 | 3/1984 |
| EP | 0 102 876 A3 | 3/1984 |
| EP | 0 102 878 A2 | 3/1984 |
| EP | 0 139 337 A2 | 5/1985 |
| EP | 0 139 337 A3 | 7/1986 |
| EP | 0 278 544 A1 | 8/1988 |
| EP | 0 795 712 A1 | 9/1997 |
| EP | 0 987 482 A2 | 3/2000 |
| EP | 1 022 834 A1 | 7/2000 |
| EP | 1 059 695 A2 | 12/2000 |
| EP | 1 101 992 A2 | 5/2001 |
| EP | 1 134 472 A2 | 9/2001 |
| EP | 1 617 517 A1 | 1/2006 |
| EP | 1 837 573 A1 | 9/2007 |
| EP | 1 892 448 A1 | 2/2008 |
| EP | 2 390 544 A1 | 11/2011 |
| FR | 2147289 A | 3/1973 |
| FR | 2 169 219 | 9/1973 |
| FR | 2 675 879 A1 | 10/1992 |
| GB | 916 461 | 1/1963 |
| GB | 1083451 A | 9/1967 |
| GB | 2 057 595 A | 4/1981 |
| GB | 2 171 139 A | 8/1986 |
| GB | 2 186 442 A | 8/1987 |
| GB | 2 221 736 A | 2/1990 |
| JP | 3-32272 A | 2/1991 |
| JP | H5-41868 A | 2/1993 |
| JP | H6-93372 A | 4/1994 |
| JP | 07-065661 A | 3/1995 |
| JP | 07-245029 A | 9/1995 |
| JP | H7-282894 A | 10/1995 |
| JP | 08-251768 A | 9/1996 |
| JP | 09-327111 A | 12/1997 |
| JP | 2006-514249 A | 4/2006 |
| NL | 1 023 687 C2 | 12/2004 |
| WO | WO 95/27165 A1 | 10/1995 |
| WO | WO 98/15764 A1 | 4/1998 |
| WO | WO 02/43212 A1 | 5/2002 |
| WO | WO 02/052187 A1 | 7/2002 |
| WO | WO 02/070939 A1 | 9/2002 |
| WO | WO 2004/111513 A1 | 12/2004 |
| WO | WO 2005/003615 A1 | 1/2005 |
| WO | WO 2007/028443 A1 | 3/2007 |
| WO | WO 2007/107342 A1 | 9/2007 |
| WO | WO 2007/139506 A1 | 12/2007 |
| WO | WO 2008/023058 A1 | 2/2008 |
| WO | WO 2010/086361 A2 | 8/2010 |
| WO | WO 2011/147490 A1 | 12/2011 |

OTHER PUBLICATIONS

International Preliminary Report on Patentability dated Nov. 5, 2014 for Application No. PCT/EP2013/067891.
International Search Report and Written Opinion dated Dec. 4, 2007 for Application No. PCT/EP2007/058814.
International Preliminary Report on Patentability dated Aug. 14, 2008 for Application No. PCT/EP2007/058814.
International Search Report and Written Opinion dated Feb. 8, 2011 for Application No. PCT/EP2010/070921.
International Preliminary Report on Patentability dated Dec. 6, 2012 for Application No. PCT/EP2010/070921.
International Search Report Written Opinion dated Jun. 29, 2007 for Application No. PCT/EP2007/002478.
International Preliminary Report on Patentability dated Jul. 1, 2008 for Application No. PCT/EP2007/002478.
International Search Report and Written Opinion dated Sep. 15, 2015 for Application No. PCT/EP2014/052708.
International Preliminary Report on Patentability dated Sep. 24, 2015 for Application No. PCT/EP2014/052708.
International Search Report and Written Opinion dated Oct. 13, 2006 for Application No. PCT/EP2006/006858.
International Search Report dated Oct. 29, 2004 for Application No. PCT/NL2004/000418.
European Search Report dated Apr. 19, 2013 for Application No. EP 13 15 1613 (2 pages).
Office Communication dated Apr. 3, 2014 for Chinese Application No. 201080067719.7.
Office Communication dated Nov. 15, 2011 for European Application No. 07 711 984.

* cited by examiner

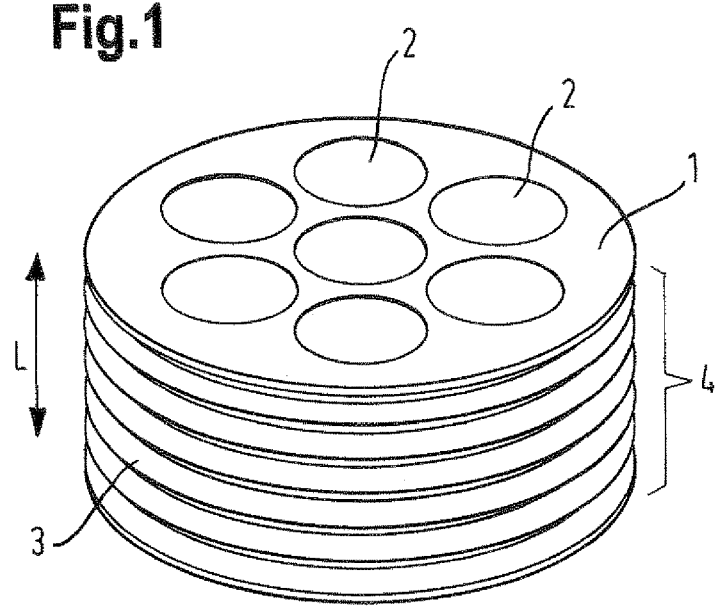
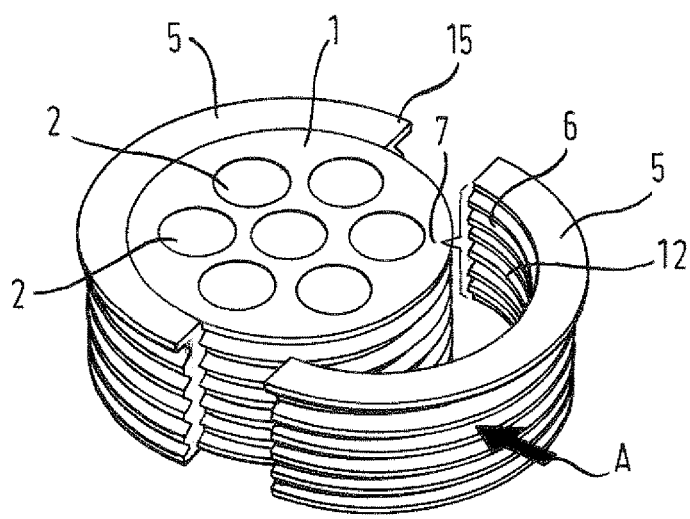

ASSEMBLY AND A METHOD FOR PROVIDING IN AN OPENING SEALING SYSTEM

RELATED APPLICATIONS

This application is a national stage filing under 35 U.S.C. § 371 of International Application No. PCT/EP2010/070921, filed on Dec. 30, 2010, which claims the benefit of European Application No. 10163749.4, filed on May 25, 2010, each of which are incorporated by reference herein in their entireties.

The invention is related to a sealing assembly for providing in an opening a sealing system through which at least one cable, pipe or duct extends.

Such an opening may comprise a tubular passage in a floor, deck or a partition. Another possibility is that the opening comprises a pipe in which another pipe is at least partly received.

Such a system can thus be used for, for instance, two connected pipes having mutually different diameters. One of the pipes may, for instance, form a house service connection and have a smaller diameter than a pipe which forms the main line or is a branch thereof. A system to which the invention relates is suitable for sealing the space located between the pipes.

It is also possible that cables for, for instance telephone, electricity, and television are fed through such pipes connected with one another. Another possibility is using the system as a seal between glass fibre cables and protective tubes.

Such a system may also be used for walls of buildings, particularly foundation walls and floors but also ceilings or roofs where, by means of "lost plastic tube parts" passages are left open in the poured concrete for feeding through tubes for water or gas, or cables. Of course, the passage may also be provided in a concrete base with the aid of a drilling method.

Further, a system to which the invention relates can be used in the construction and/or maintenance of new buildings, ships and offshore installations. Sections in such constructions are usually formed by placing prefabricated partitions according to a predetermined plan, for instance in a dock of the shipyard where a vessel is being built. Even before the partitions are placed, feed-through sleeves can be provided in the partitions, for instance with the aid of a welding method.

The space between the feed-through sleeve and at least one tube, duct or cable is herein below often simply referred to as "the space".

GB 2186442 describes a transit system for cables and pipes. The system comprises a metal transit-unit having an opening filled with lead-through blocks and blanking blocks. The lead-through blocks comprise two half-blocks which can together form a block having an opening through which a pipe, cable or duct can be fed. In other words, two halves of the lead-through blocks can surround a pipe, cable or duct. Each pipe, cable or duct is thus surrounded by at least two blocks. The remaining space in the opening is filled up with blanking blocks. In this way the space between the inner wall of the feed-through sleeve, in this case often a metal transit-unit, and the pipes, ducts or cables extending through the sleeve or metal transit-unit is filled up with blocks. It is possible that a stay plate is positioned between each layer of blocks. Pressure is then applied to the assembled blocks to compress the blocks around the cable, pipe or duct to seal the lead-through blocks around the cable, pipe or duct and to clamp them together and against the side walls of the transit-unit or the conduit sleeve and to the stay plate. For this purpose, the system comprises a compression and packer system. Pressure can be applied by a system that requires tightening of nuts or compression bolts. The forces needed for compression are very high and partly passed on to the ducted pipe or cable, often non-hydrostatically.

This system cannot distribute the load evenly throughout the stacking of blocks. In fact, the ducted pipe or cable will carry a part of the load and prevent an even distribution. The blocks which are much less subjected to compression "in the shade" of the ducted pipe or duct can easily be forced out as the pressure is not passed on to these blocks.

This system is not suitable for so-called coax cables as the pressure applied, particularly when this is non-hydrostatic, will undesirably affect the impedance. This system is also not suitable for glass fibers (often used for transmission of signals formed by light-waves) as any pressure, particularly when this is non-hydrostatic, would unpredictably affect the performance in transmission.

Another problem is the uneven deformation of the rubber, which reduces the flexibility of the transit system. This can be detrimental when a part of the system is suddenly exposed to a much higher pressure, and such flexibility would be advantageous.

Not only is the system difficult to install, time-consuming, costly, requires a large inventory control, and leads to an unbalanced distribution of pressure, the system further works unsatisfactorily in the long-run. Rubber, even well vulcanised rubber, has a natural relaxation occurring over time. When the rubber has not been properly saturated or vulcanised, also chemical relaxation can occur. This enhances the overall relaxation of the rubber. As a consequence of this, compression bolts or nuts of the compression and packer system of the system described in GB 2186442, need to be retightened frequently.

A further problem is that a change in temperature will, due to thermal expansion or shrinkage, result in loosening or over-tightening of the compression bolts, resulting in respectively weakening the sealing and irreversible (permanent) deformation of the rubber.

In particular when plastic pipes or cables with plastic braidings extend through the feed-through sleeve, the outer surface of these pipes or cables is subjected to radial inward pressure and the outer diameter of these plastic pipes or cables may decrease due to a phenomenon known as "creep". If this occurs, compression bolts and nuts of the compression and packer system should be retightened even more frequently as the integrity of the sealing provided by the compressed rubber blocks and the compressed plastic pipes or cables diminishes by both physical phenomena, creep and relaxation. However, no matter how frequently the compression bolts and/or nuts are retightened, immediately after retightening, the phenomena of relaxation of the rubber and creep of a plastic pipe will continue to occur so that the integrity of the sealing immediately deteriorates.

The system does not allow for partly or completely replacing the rubber blocks, as new rubber blocks would not fit tightly anymore to the outer walls of the plastic pipes or the plastic braidings, particularly when these were unpredictably and unequally deformed due to the creep phenomenon described above.

Known are systems where a rubber ring is coaxially placed in a feed-through sleeve around a pipe ducted through the conduit. The rubber ring is then compressed between steel ring shaped plates. Although this leads to the building up of radial forces of equal strength, the problems of relaxation of the rubber and, in case of plastic pipes, the problems of creep necessitate also for these systems frequent retightening of the compressing steel plates.

WO 2004/111513 describes a system, in more detail a plug, made of an elastically deformable material for insertion in a space between an inner wall of a feed-through sleeve, and a pipe, cable or duct extending through that sleeve. The plug usually comprises at least two segmental longitudinal parts for forming a sealing plug which can be received in the space. The longitudinal parts are each provided with an outside which comprises a number of outer ribs spaced apart in a longitudinal direction for realizing, in use, annular contact surfaces which are each closed in itself in a circumferential direction between the sealing plug and the inner wall of the opening.

Each of the longitudinal parts is further provided on the inside with a number of inner ribs for realizing, in use, annular contact surfaces of which each is closed in itself in a circumferential direction between the sealing plug and the pipe, cable or duct extending through the opening.

Each of the longitudinal parts is further provided with an outer collar intended to be placed against an outer edge of the opening. When the plug is assembled these collars are part of a flange which is such that forces can be exerted onto the flange for inserting the longitudinal parts. The flange is designed such that it can be placed against the outer edge of the opening. The outer edge of the opening is thus covered by the flange. The flange further ensures equal insertion, so that the outer ribs of the longitudinal parts are lined up to form the annular contact surfaces and such that the inner ribs are lined up to form the annular contact surfaces.

An advantage of this sealing system is that it is very easy to insert, and after applying grease to the longitudinal parts, manual insertion may even be possible. Due to the flange, it is highly unlikely that the plug will be further pushed into the feed-through sleeve or opening, not even when a very high pressure is applied to the flange. It has been shown that this sealing system retains its sealing integrity also when a very high pressure is applied to the side of the plug that is first inserted into the opening or conduit sleeve. Only after application of a very high pressure on that end of the plug, may the plug be forced out of the conduit sleeve or opening. Another advantage is that the ribs provide some flexibility in the sealing system, so that no retightening is needed. When the rubber relaxes, the ribs still provide annular contact surfaces and thus a sealing remains intact. This response also applies to the unlikely occurrence of creep which would result in a smaller diameter of a plastic pipe extending through the opening or conduit sleeve. As the actual radial load applied to a plastic pipe extending through the feed-through sleeve will, due to the relaxation of the rubber, decrease in time, the possible occurrence of creep will decrease rather than increase.

WO 02/43212 describes a system for passing a cable, a conduit, a pipe or the like sealingly through an opening in a wall, comprising a sealing device made of an elastic material, such as rubber. This system includes at least one lead-through channel having a smooth inner wall, wherein the sealing device is externally provided with axially spaced-apart, circular, at least substantially inflexible, compressible ribs lying in (imaginary) radial planes, whose outside diameter is larger than the inside diameter of the opening. The system furthermore includes at least one grommet to be fitted round the cable, the conduit, the pipe or the like that is to be passed through, which grommet can be fitted sealingly in said lead-through channel. Said grommet, which has a smooth outer side, includes a bore whose wall is provided with axially spaced-apart, circular, at least substantially inflexible, compressible ribs lying in (imaginary) radial planes, whose inside diameter is at least substantially identical to the outside diameter of the cable, the conduit, the pipe or the like that is to be passed through.

WO 2008/023058 describes a system for providing a sealing system for a situation wherein one or a plurality of cables, pipes or ducts extend through an opening. The system comprises a transit-unit which is sealingly fixed or fixable into or onto the opening. The transit-unit comprises one or a plurality of conduits which are each suitable for receiving at least one of the plurality of cables, pipes or ducts. Each of the conduits is further suitable for receiving an elastically deformable plug for sealingly filling space between an inner circumferential wall of the conduit and the one or more cables, pipes or ducts extending through that conduit. This system is very suitable where the opening is in a partition, such as a ceiling or floor made from steel or another metal alloy.

WO 2008/023058 describes that the transit-unit itself can be of steel or aluminium. The transit-unit is normally provided with a flange for welding the transit-unit to a steel or aluminium construction element or for bolting the transit-unit to a partitioning construction element. Under these circumstances, such a system can sustain a high pressure, even a sudden increase in load. However, such a way of sealingly fixing the transit-unit into or onto a conduit sleeve or another form of an opening, requires careful planning a long time ahead of the actual construction, is time-consuming, requires input of skilled and thus costly workers and disallows for easy replacement of the transit-unit by, for instance, another transit-unit with differently sized conduits.

It is an object of the present invention to solve at least one of these problems associated with sealingly fixing the transit-unit into or onto an opening.

SUMMARY OF THE INVENTION

The invention provides a sealing assembly for providing in an opening a sealing system through which at least one cable, pipe or duct extends. The system comprises a transit-unit of a relatively inflexible material. The transit-unit comprises one or a plurality of conduits extending in a longitudinal direction of the transit-unit. Each conduit is suitable for receiving at least one of the cables, pipes or ducts. The transit-unit has an outer circumference which is provided with a first profile. The assembly further comprises an outer plug 15 comprising at least two segmental longitudinal parts which are of an elastic material, compared with the inflexible material of the transit-unit. The outer plug 15 has an inside which is provided with a second profile. In the assembled condition, the outer plug 15 surrounds the transit-unit at the outer circumference. In an assembled condition, the first profile and the second profile match such that movement of the transit-unit relative to the outer plug 15 is inhibited in the longitudinal direction.

This assembly allows for putting the outer plug 15 and the transit-unit in the assembled condition and inserting the outer plug 15 and the transit-unit in the assembled condition into the opening so that the transit-unit is clamped in the opening by the outer plug 15. This improves and simplifies the sealingly fixing of the transit-unit into the opening.

Furthermore, as will be explained later on in more detail, the system as installed will have additional resilience due to the outer plug 15, in both the longitudinal direction and the transverse direction.

In an embodiment of an assembly according to the invention, it applies that in a non-assembled condition of the assembly and in an assembled condition of the outer plug 15 in which the outer plug 15 is free from radial compression, a total length of the inside of the outer plug 15 measured in circumferential direction is, at each position along the longitudinal direction, smaller than the total length of the outer circumference of the transit-unit at the corresponding position along the longitudinal direction. This improves the capability of the outer plug 15 to clamp the transit-unit in the opening, which can be explained as follows. It follows from the relative length dimensions of the inside of the outer plug 15 and the outer circumference of the transit-unit that there will, somewhere along the circumferential direction, be a gap between the two segments which form the outer plug 15 when the assembly is put in the assembled condition. This gap (there could be two or more gaps, depending on the number of segments), allows for expansion of a segment in the circumferential direction once the outer plug 15 is subjected to a radial compression. A radial distance between the transit-unit and the inner wall of the opening will generally be relatively small. The outer plug 15 can easily be compressed in radial direction due to the possibility to lengthen each of the at least two segments of the outer plug 15 in circumferential direction of the plug. This contributes to the ease of inserting the assembled assembly into the opening. Opposed requirements of conveniently installing the assembly and realizing a tight sealing are thus both met. The outer plug 15 will seal off the annular space between the transit-unit and the inner wall of the opening as well as tightly hold the transit-unit in the opening.

Furthermore, as the outer plug 15 can be relatively thin, the transit-unit can occupy a large cross-section of the opening, allowing for many cables and/or pipes and/or ducts to be extended through the transit-unit and the opening. Such a fixing of the transit-unit does not require workers with special skills. The insertion of the system into the opening is not time-consuming and can be carried out at any desired moment in time. It also allows for non-invasive removal of the transit-unit should this be needed at some stage. The opening will not be damaged by such removal. Re-filling the opening with a similar assembly is then no problem.

According to an embodiment of an assembly according to the invention, in a non-assembled condition of the assembly and in an assembled condition of the outer plug 15 (in which the outer plug 15 is free from radial compression), at each position along the longitudinal direction the diameter of the inside of the outer plug 15 is smaller than the diameter of the outer circumference of the transit-unit at the corresponding position along the longitudinal direction. On putting the assembly in the assembled and installed condition, the diameter of the inside of the outer plug 15 increases to fit to the outer circumference of the transit-unit. This contributes to generating the forces for clamping of the transit-unit in the opening. Also in that process, the segments of the outer plug 15 might lengthen in circumferential dimension.

In an embodiment of an assembly according to the invention, each of the conduits comprises an unrestricted part and a restricted part which are in longitudinal direction next to each other. Such an embodiment allows for the insertion of segmented inner plugs 16 for sealingly filling a space in the respective conduit between an inner circumferential wall of the unrestricted part of the conduit and the at least one cable, pipe or duct extending through that conduit. Advantageously, the restricted part hinders movement of the inserted inner plug 16 along the restricted part, providing the possibility for dynamic sealing (as will further be elaborated on below), although this is not essential within the present invention. Furthermore, such a restricted part ensures that the inner plug 16 cannot be inserted too far i.e. not to the extent that it would be pushed out at the other end of the conduit. This advantageously has consequences for densely distributing the conduits over the transit-unit (as will also further be elaborated on below).

In an embodiment of an assembly according to the invention, the assembly ideally further comprises for each of the conduits a segmented inner plug 16 of an elastic material, compared with the inflexible material of the transit-unit, for sealingly filling a space in the unrestricted part of the conduit between an inner circumferential wall of the conduit and the at least one cable, pipe or duct extending through that conduit. Such segmented inner plugs 16 usefully contribute to the further sealing in a simplified way. Use can be made of existing plugs, making the sealing assembly of the present invention economically attractive. Although the outer diameter of the segmented inner plug is clearly predetermined on the basis of the inner diameter of the conduit of concern, the sealing system is flexible with regard to the outer diameters of the cable, pipe or duct. The segmented inner plug 16 can be provided with an inner diameter suitable for use with the outer diameter of that cable, pipe or duct.

In an embodiment of an assembly according to the invention, each of the inner plugs 16 has a length such that the entire inner plug 16 fits in the unrestricted part of the respective conduit. This has the advantage that a distribution of the conduits does not have to take into account dimensions of the inner plugs 16 which prevent the plug from fitting in the unrestricted part of the conduit. That in turn means that the distribution can be determined exclusively by the material strength of the transit-unit, which determines the minimum thickness of parts of the transit-unit that will be exposed to high pressures. The distribution of conduits can thus be denser if a stronger material is used for the transit-unit.

In an embodiment of an assembly according to the invention, each of the inner plugs 16 is free from a flange. This provides a very practical embodiment of inner plugs 16, and allows for the dense distribution of the conduits over the transit-unit. The density is only determined by the thickness of the wall between the conduits, not by the need to avoid overlaps of flanges of inner plugs 16.

In an embodiment of an assembly according to the invention, the outer plug 15 is provided with a flange. Such a flange prevents inserting the assembly too far into the opening and offers a surface against which force can be applied for inserting the assembled assembly into the opening. Furthermore, also such outer plugs 15 exist and are commercially available, making the sealing assembly according to the invention in many aspects economically attractive.

In an embodiment of an assembly according to the invention, the first profile comprises a number of radially outwardly extending ribs which each extends in the circumferential direction. Advantageously, this allows for a uniform resistance along the circumference of the transit-unit against a movement in the longitudinal direction of the transit-unit relative to the outer plug 15.

In an embodiment of an assembly according to the invention, the second profile comprises a number of radially inwardly extending ribs of which each extends in the circumferential direction. Advantageously, outer plugs 15 having such a second profile are known and are commercially available. Such ribs are for realizing annular contact surfaces with, for instance, an outer surface of a pipe which it holds in an opening in a clamped and sealed fashion. It follows that the assembly can be produced in a relatively cost-effective way, and no new moulds need to be produced for the manufacture of such outer plugs 15.

In an assembly according to the invention, in the assembled condition the positions of the inwardly extending ribs and the outwardly extending ribs alternate each other in the longitudinal direction. This provides for an optimum way of hindering movement in the longitudinal direction of the transit-unit relative to the outer plug 15.

The invention is further related to a method for providing in an opening a sealing through which at least one cable, pipe or duct extends. Such a method comprises providing a transit-unit of relatively inflexible material. The transit-unit comprises one or a plurality of conduits extending in a longitudinal direction of the transit-unit. Each conduit is suitable for receiving one of the at least one cable, pipe or duct. The transit-unit has an outer circumference which is provided with a first profile.

The method further comprises providing an outer plug 15 comprising at least two segmental longitudinal parts which are of an elastic material, compared with the inflexible material of the transit-unit. The outer plug 15 has an inside which is provided with a second profile.

The method further comprises providing for each of the conduits a segmented inner plug 16 of an elastic material, compared with the inflexible material of the transit-unit, for sealingly filling a space in the conduit between an inner circumferential wall of the conduit and the at least one cable, pipe or duct.

In an assembled condition the outer plug 15 surrounds the outer circumference of the transit-unit. in that condition, the first profile and the second profile match each other such that movement of the transit-unit relative to the outer plug 15 is inhibited in the longitudinal direction.

The method further comprises:
  putting the outer plug 15 and the transit-unit in the assembled condition by positioning the outer plug 15 such that it surrounds the transit-unit at the outer circumference;
  inserting the outer plug 15 and the transit-unit in the assembled condition into the opening so that the transit-unit is clamped in the opening by the outer plug 15;
  passing at least one cable, pipe or duct through the plurality of conduits; and
  inserting in each conduit one of the segmented inner plugs 16 for sealingly filling a space in the respective conduit between an inner circumferential wall of the respective conduit and the at least one cable, pipe or duct extending therethrough.

This provides for a simple and straightforward way of providing in an opening a sealing system through which at least one cable, pipe or duct extends. The method is simple and likely to be foolproof, can be carried out in a relatively short space of time, and does not require the presence of extra equipment. Above all, it leads to a sealing system that is low-maintenance and that can serve a very long time.

In an embodiment of a method according to the invention, the opening itself is a conduit in a transit-unit as referred to above. In such a method, the sealing is provided such that there is more than one possibility for responding dynamically to a sudden increase in pressure applied in the longitudinal direction. Also in transverse direction, there is more than one possibility for offering flexibility in case the cable, pipe or duct extending through the opening moves relative to the opening in transverse direction. This will later on be explained in more detail.

The invention is further explained and illustrated in the accompanying drawing, in which:

FIG. 1 shows a transit-unit of an embodiment of an assembly in accordance with the invention;

FIG. 2 shows a transit-unit and an outer plug 15 of an embodiment according to the invention;

Figure 3:
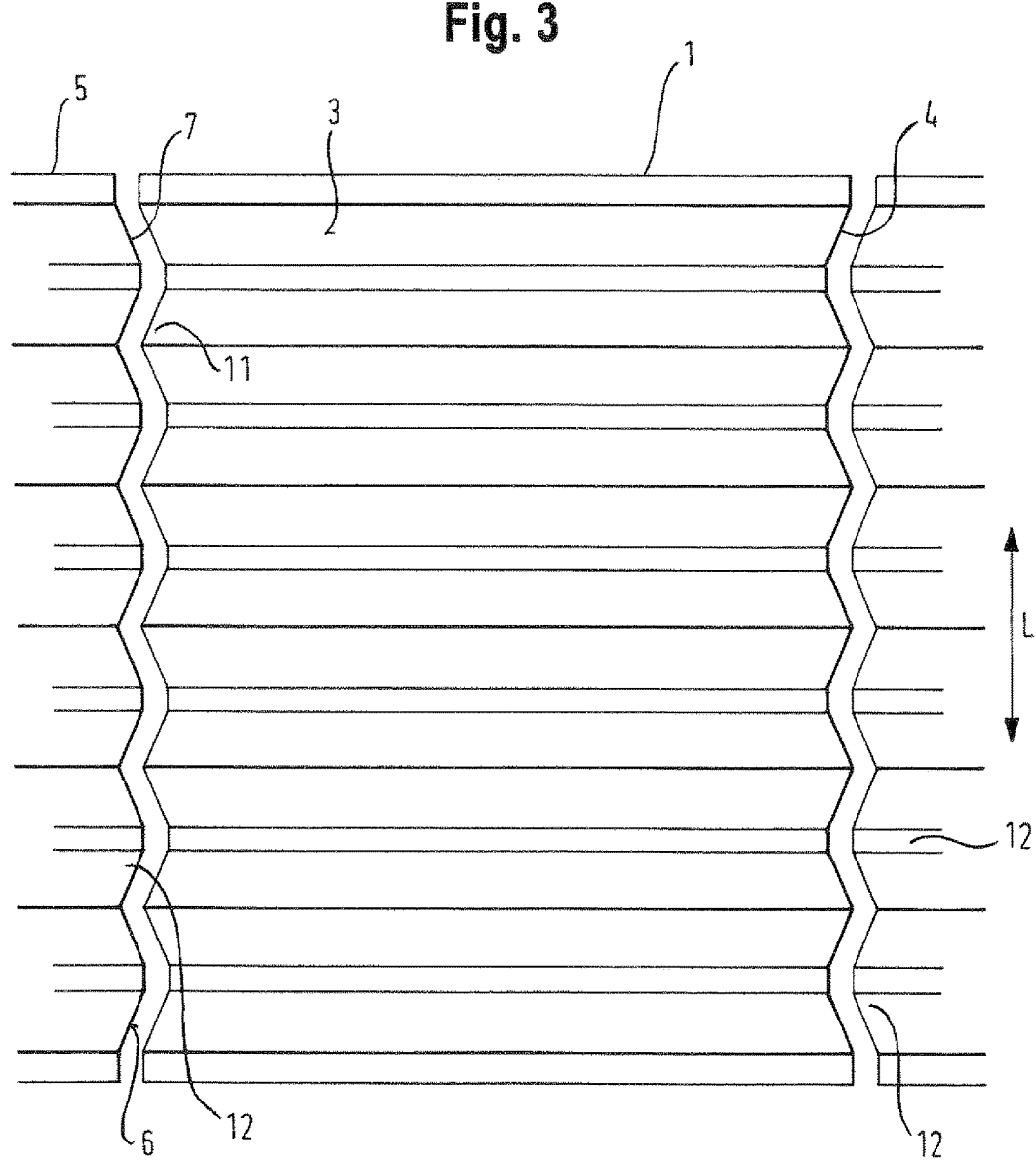
Figure 4:
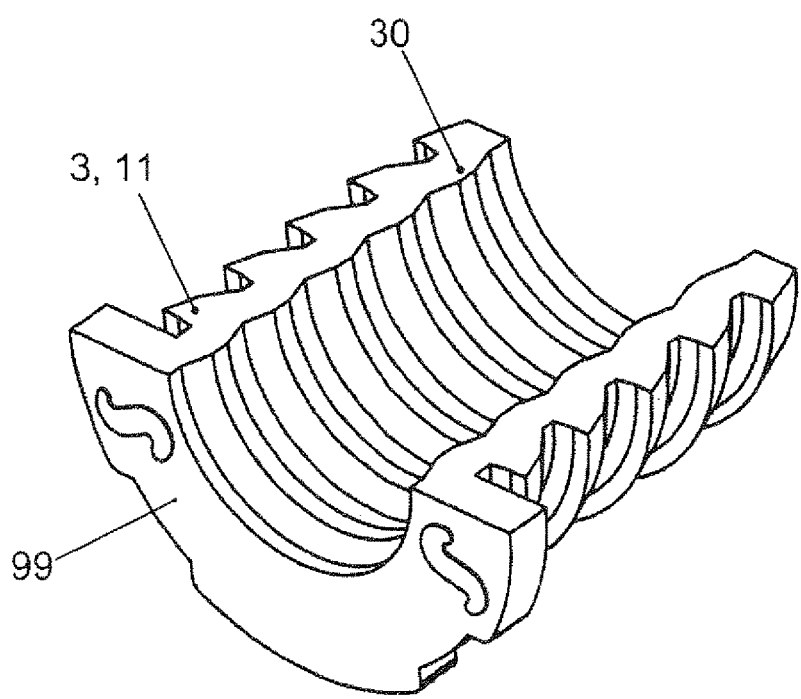
Figure 5:
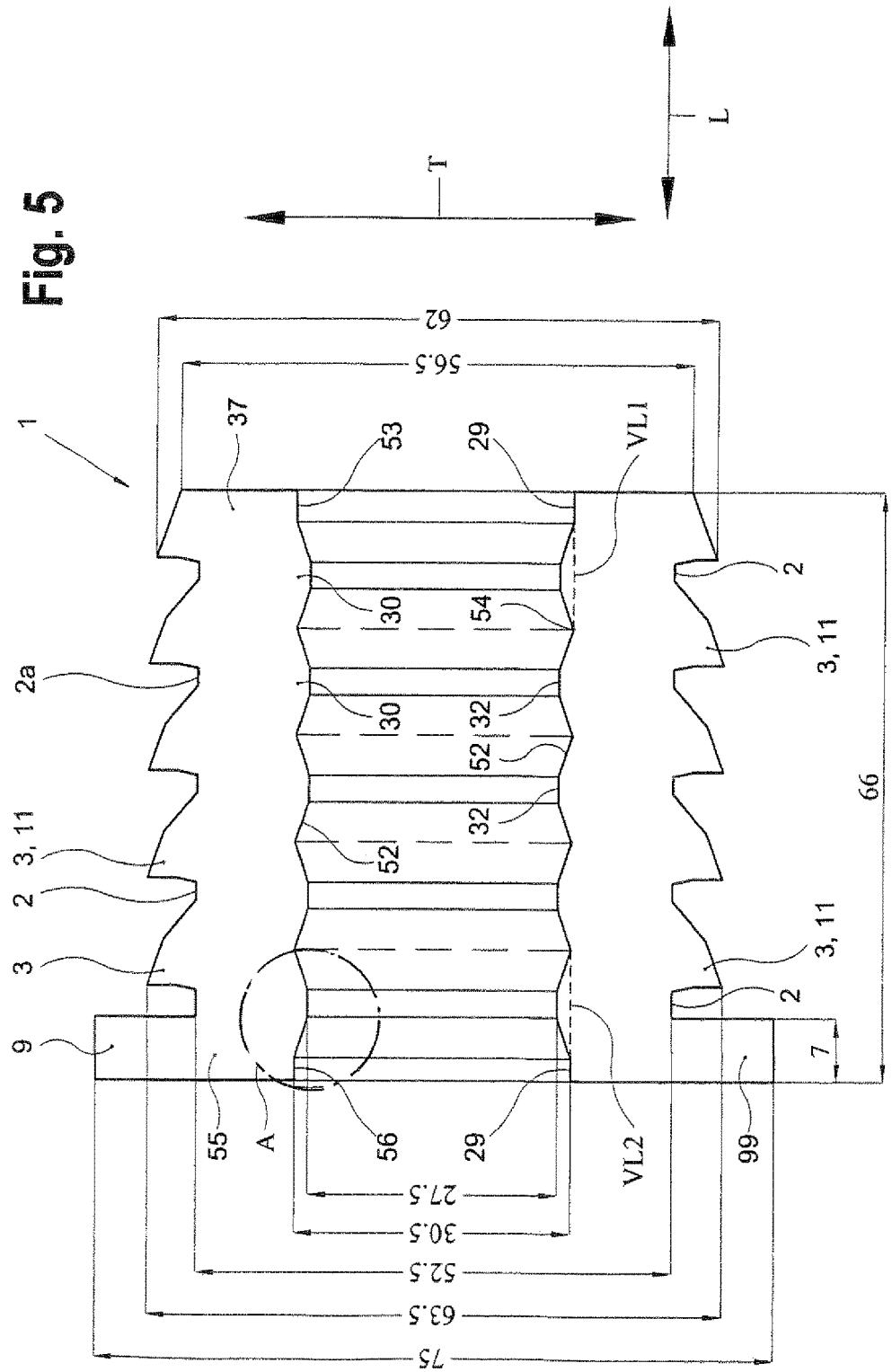
Figure 6:
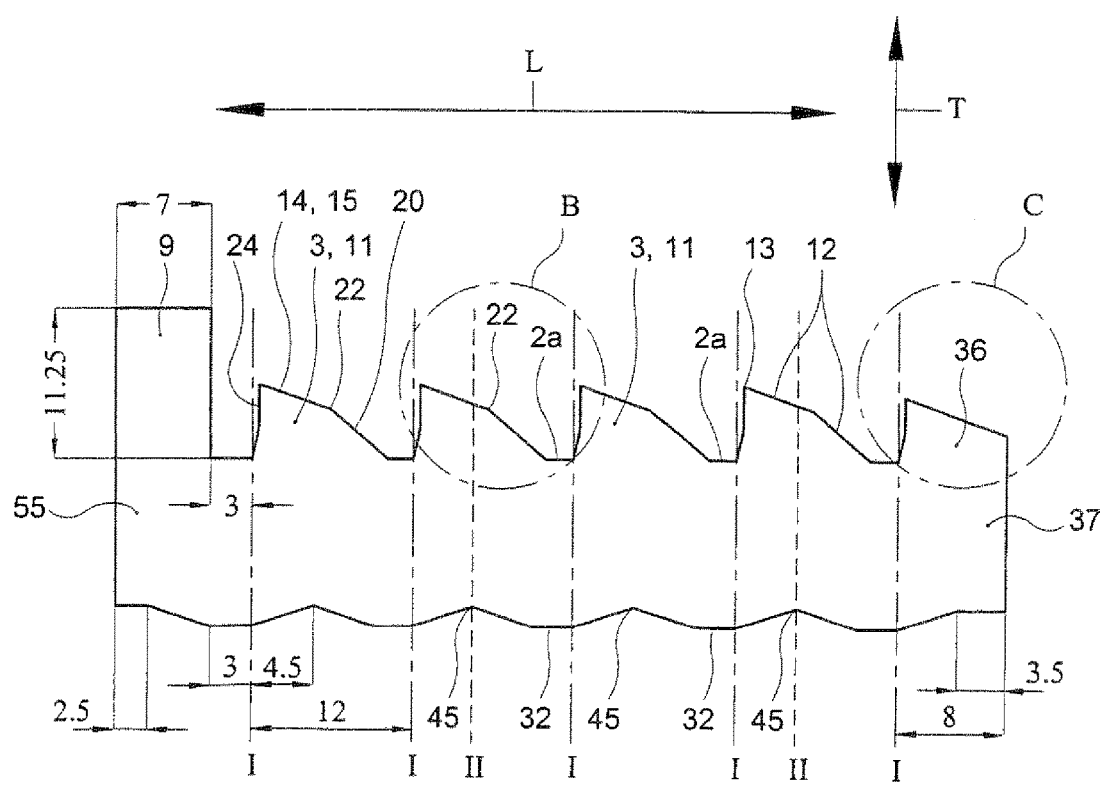
Figure 7:
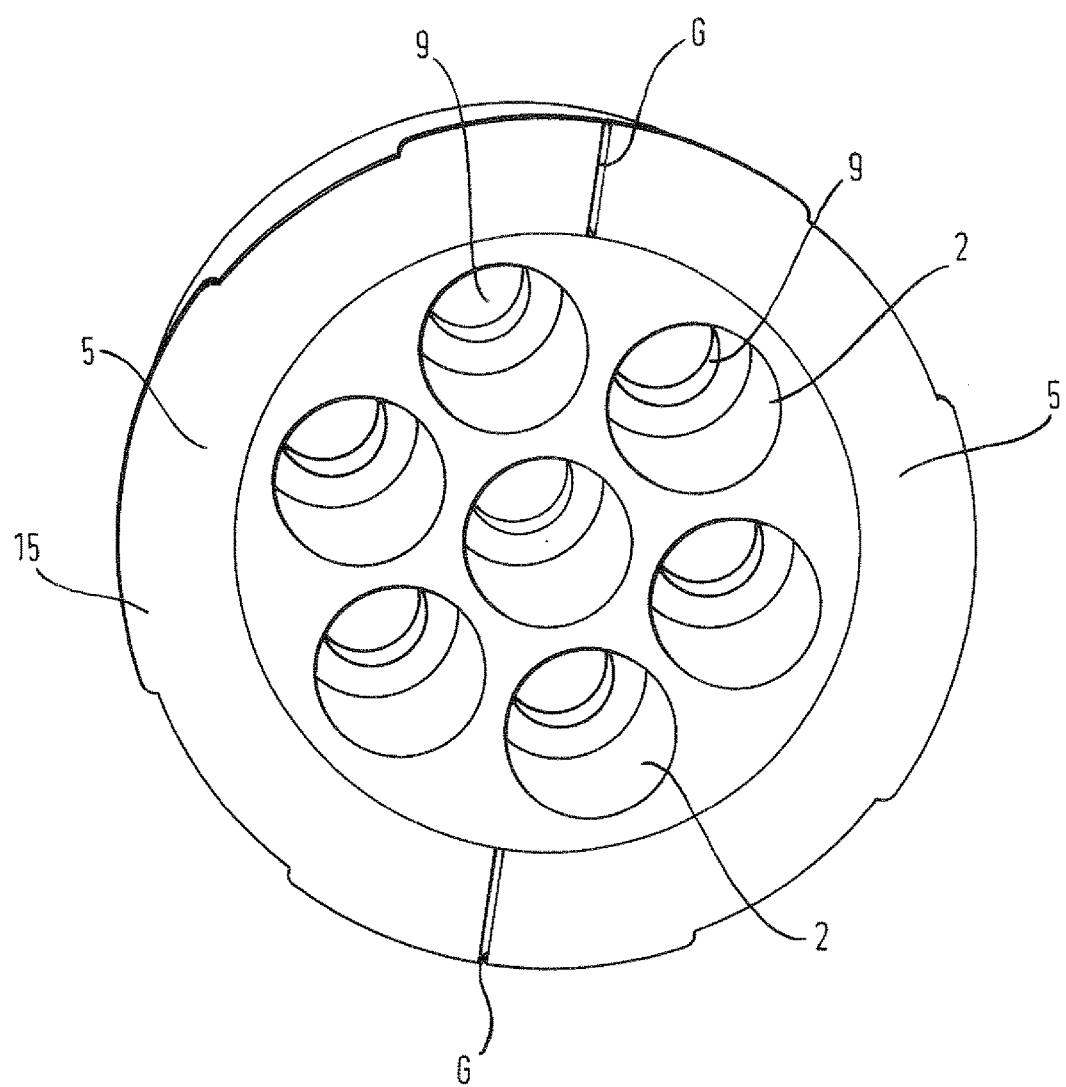
Figure 8:
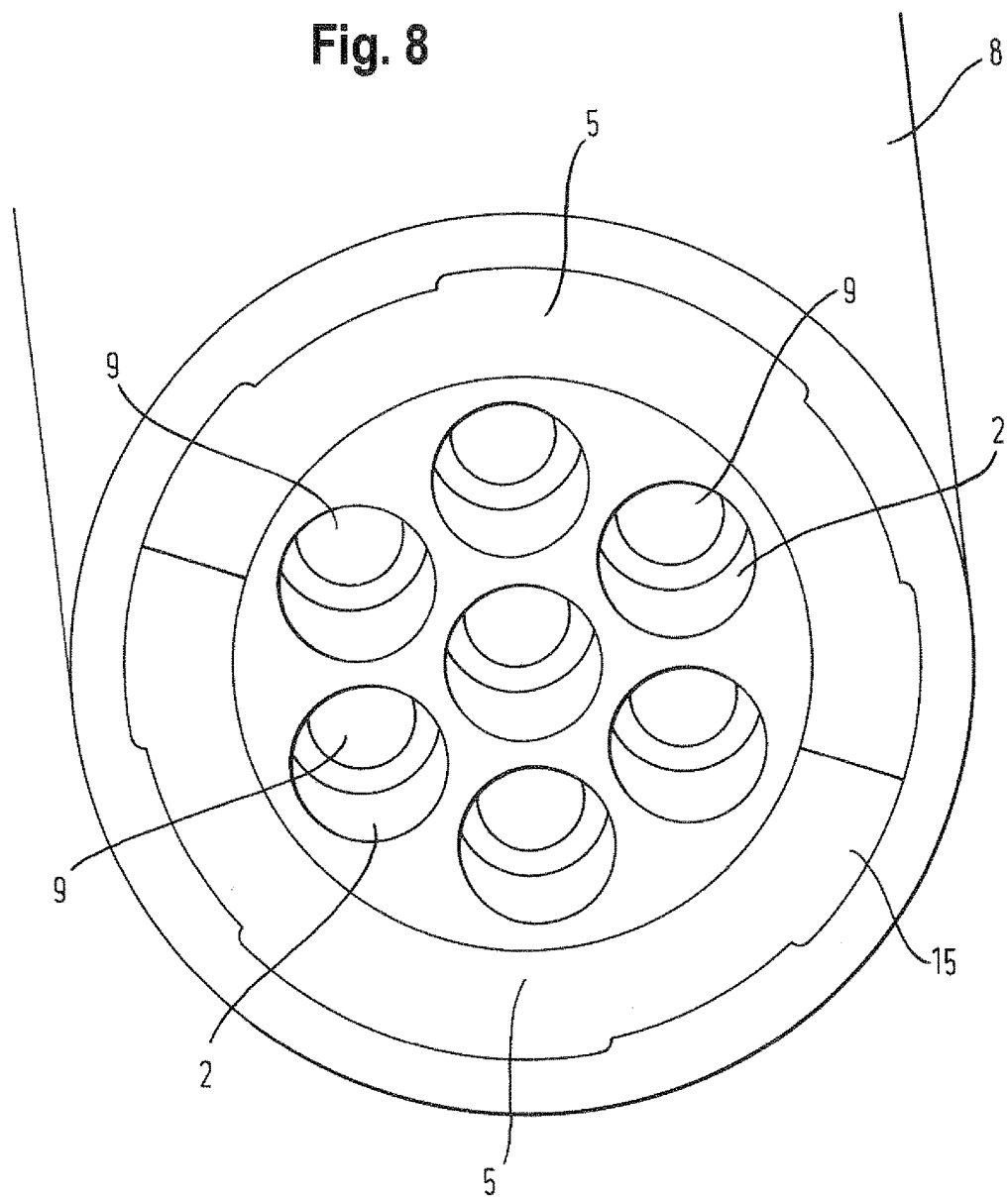
Figure 9:
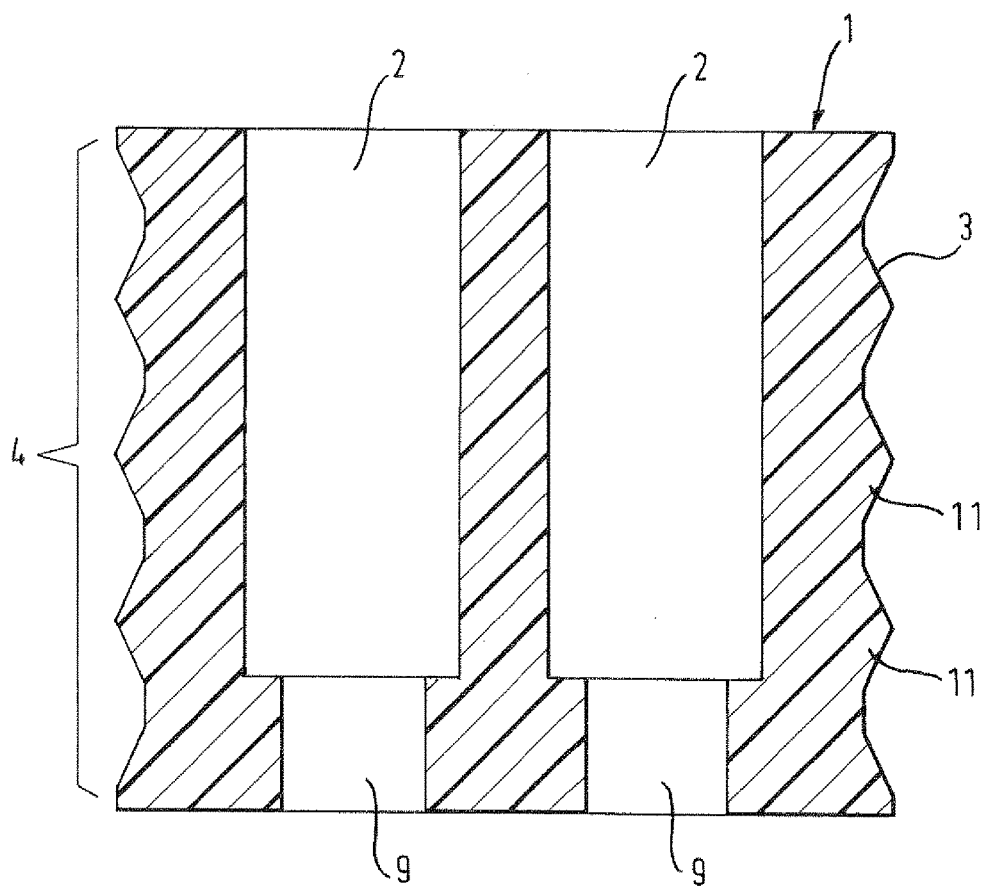
Figure 10:
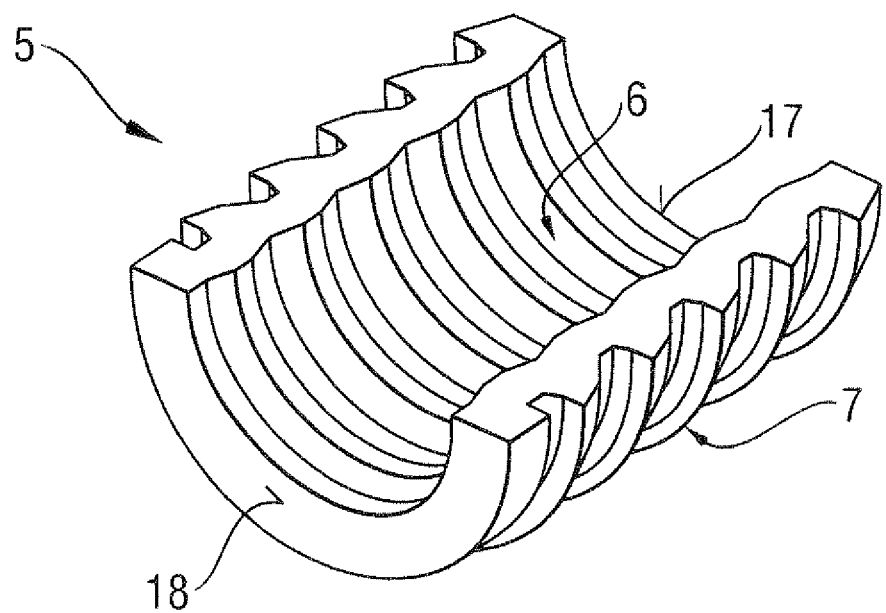
Figure 11:
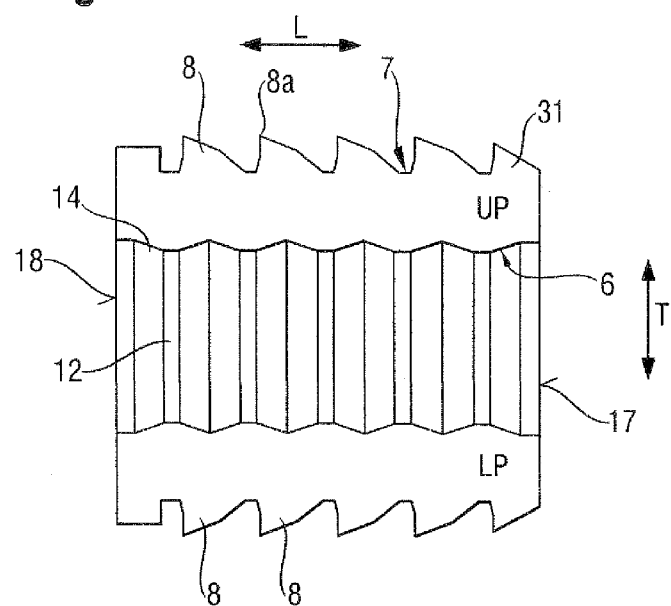
Figure 12:
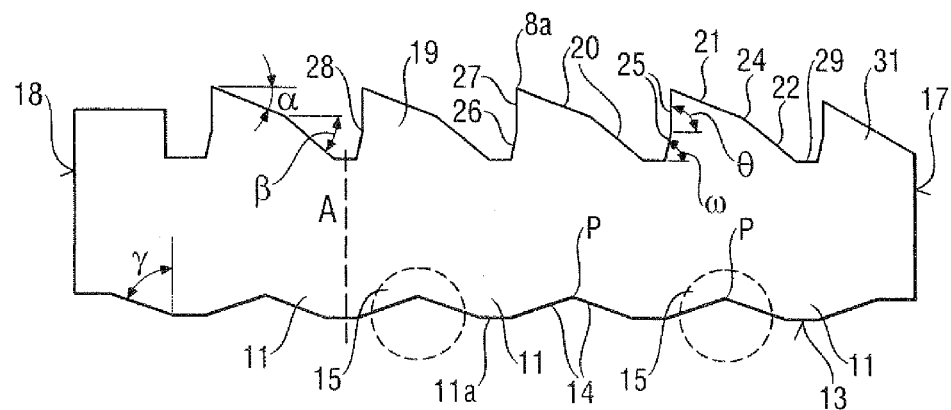
Figure 13:
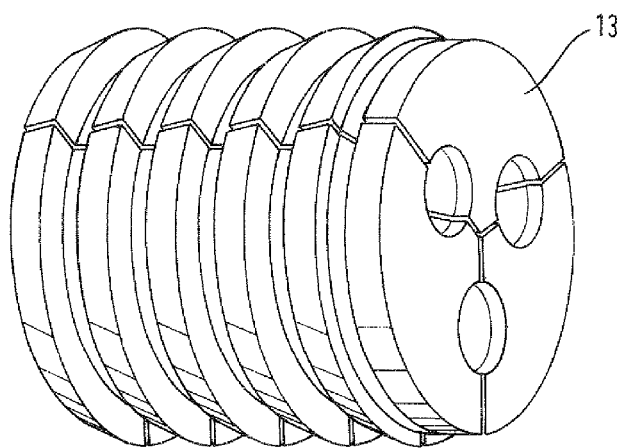
Figure 14:
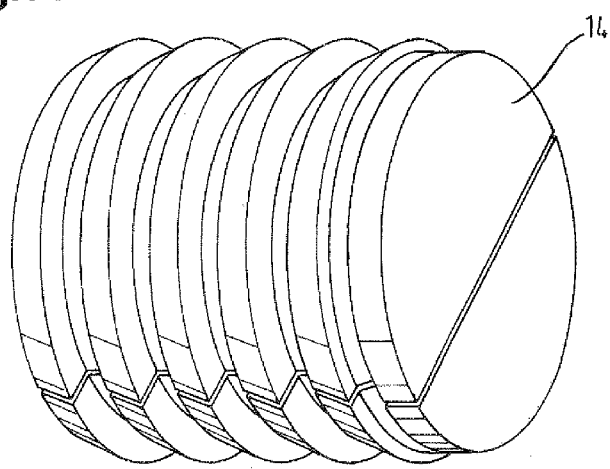
Figure 15:
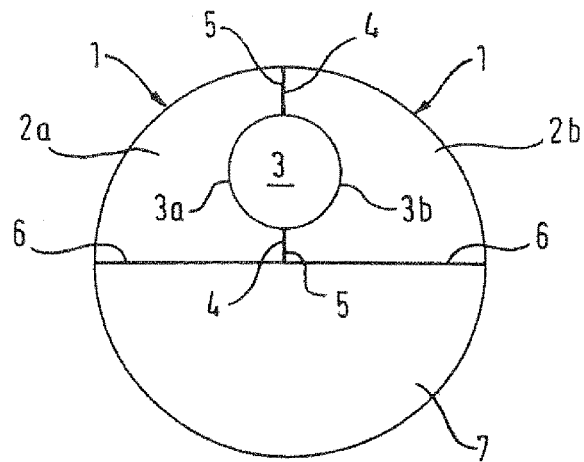
Figure 16:
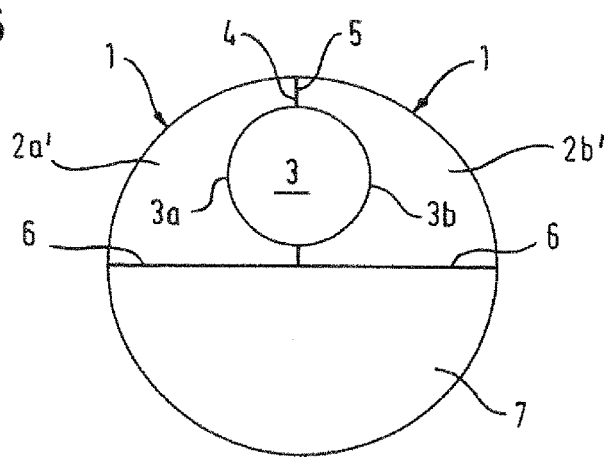
Figure 17:
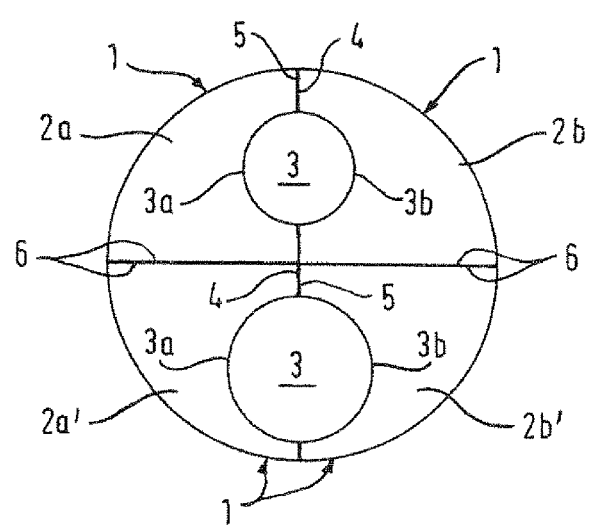
Figure 18:
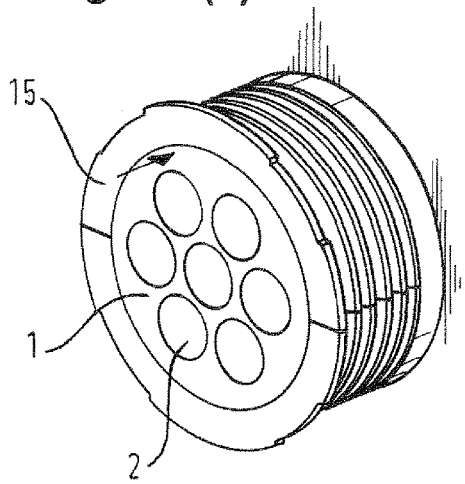
Figure 18:
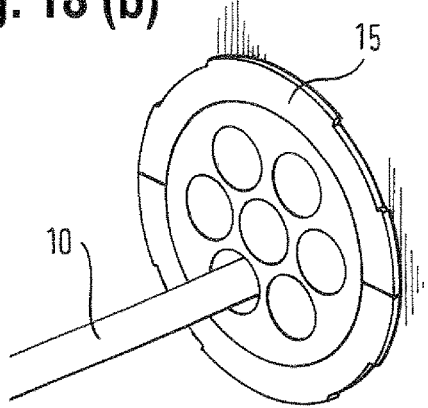
Figure 18:
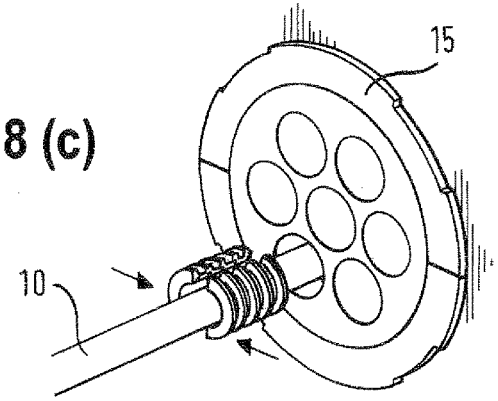
Figure 18:
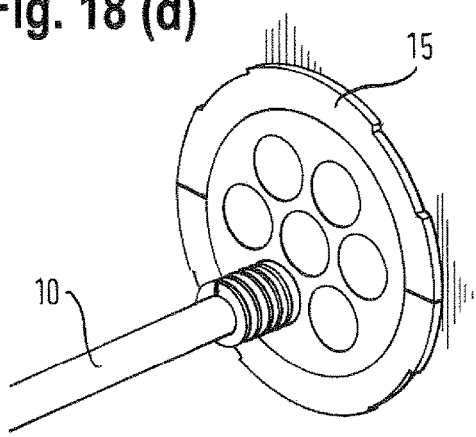
Figure 18:
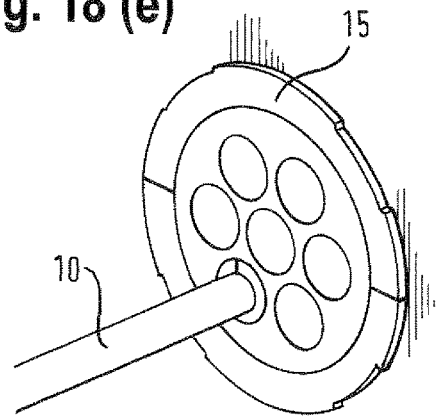
Figure 18:
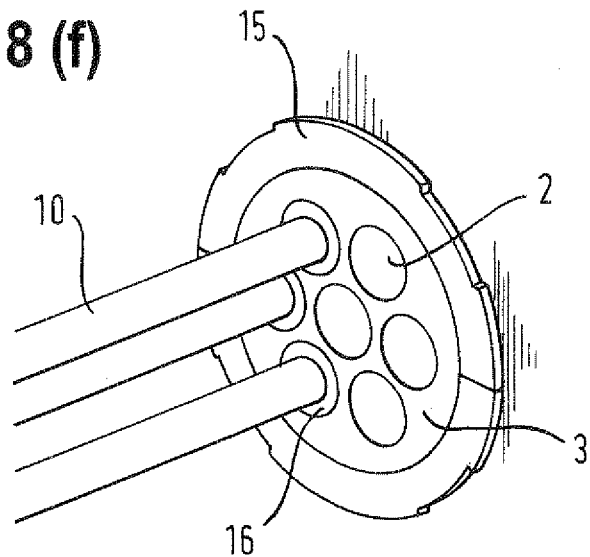
Figure 18:
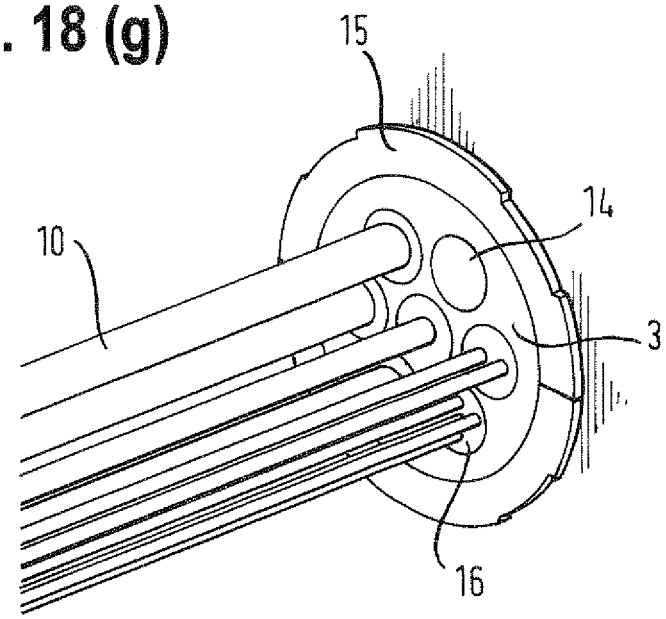
Figure 19:
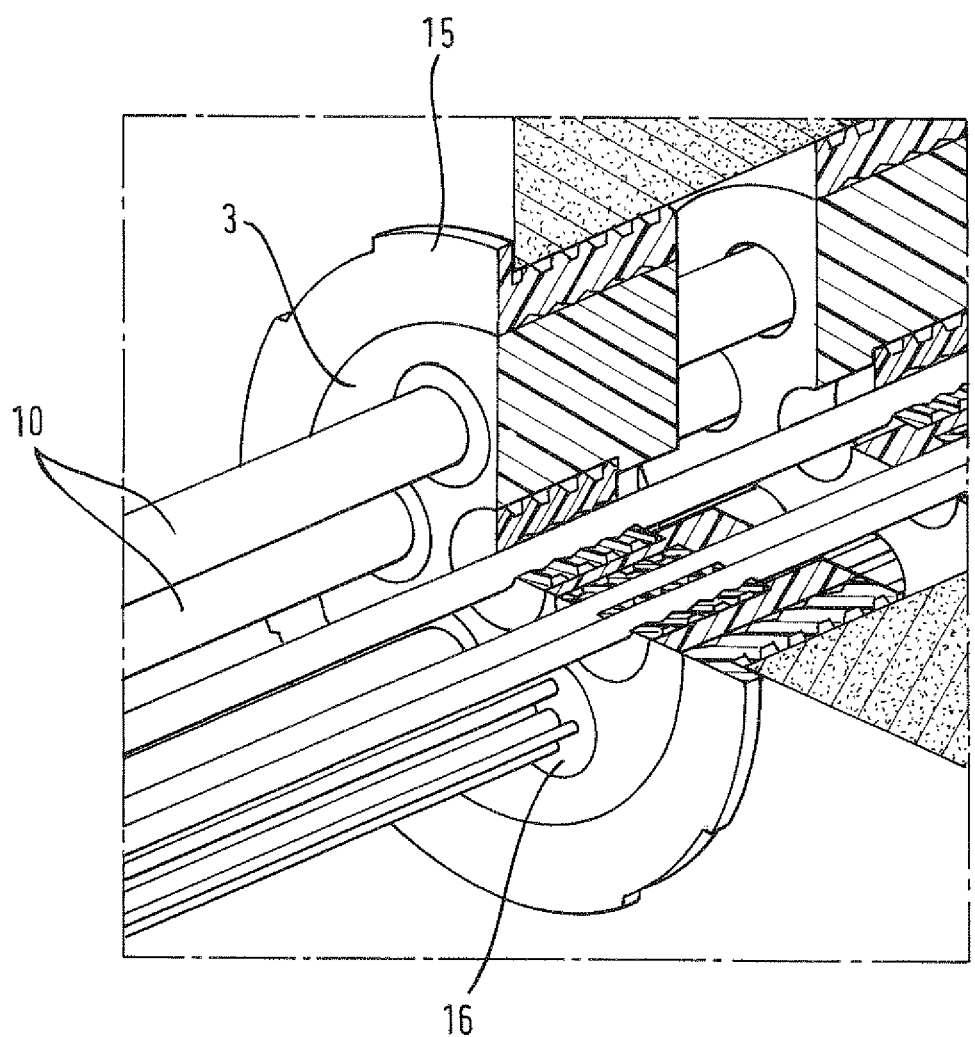

FIG. 3, a close-up view of a transit-unit and of a part of an outer plug 15 of an embodiment according to the invention;

FIG. 4, a perspective view of one segmental longitudinal part of an outer plug 15 of an embodiment according to the invention;

FIG. 5, a view onto an inside of a segmental longitudinal part of an outer plug 15 of an embodiment according to the invention;

FIG. 6, in more detail, a cross-section along a longitudinal direction of a segmental longitudinal part of an outer plug 15 of an embodiment according to the invention;

FIG. 7, a perspective view of a transit-unit and an outer plug 15 of an embodiment according to the invention in an assembled condition;

FIG. 8, a perspective view of a transit-unit and an outer plug 15 of an embodiment according to the invention in the assembled and installed condition;

FIG. 9, a cross-sectional view along a longitudinal direction of a transit-unit of an embodiment according to the invention;

FIG. 10, a perspective view of one segment of an inner plug 16 of an embodiment according to the invention;

FIG. 11, a view onto an inside of a segment as shown in FIG. 10;

FIG. 12, a more detailed cross-section along a longitudinal direction of a segment as shown in FIG. 10;

FIG. 13, in perspective an inner plug 16 of an embodiment according to the invention;

FIG. 14, a perspective view of an inner plug 16 of an embodiment according to the invention;

FIG. 15, schematically a view onto a cross-section along a transverse direction of an inner plug 16 of an embodiment according to the invention;

FIG. 16, schematically a view onto a cross-section along a transverse direction of an inner plug 16 of an embodiment according to the invention;

FIG. 17, schematically a view onto a cross-section along a transverse direction of an inner plug 16 of an embodiment according to the invention;

FIGS. 18(*a*)-(*g*), perspective views of various stages reached during carrying out an embodiment of a method according to the invention;

FIG. 19, a perspective and partly exploded view of the use of an embodiment according to the invention.

FIG. 1 shows a part of an assembly for providing in an opening a sealing through which at least one cable, pipe or duct extends. The part shown in FIG. 1 concerns a transit-unit 1 of a relatively inflexible material, for instance, high molecular density polyethylene. The transit-unit 1 comprises one or, as shown in FIG. 1, a plurality of conduits 2, each extending in a longitudinal direction L of the transit-unit 1. As more easily shown in FIGS. 18(*b*)-(*g*), each conduit 2 is suitable for receiving one cable 10, or even more cables 10.

In the following, reference is each time made to cables 10 as extending through the conduits 2 or as passed through the plurality of conduits 2. However, it is to be understood that instead of a cable, also a pipe or duct could be passing through a number of the conduits. Also a combination of for instance one cable and one pipe could be passing through one or more conduits 2. Later on in this description, further reference is made to these possibilities.

The transit-unit 1 has an outer circumference 3 which is provided with a first profile 4.

FIG. 2 shows again transit-unit 1 as well as another part of the assembly, namely an outer plug 15 comprising, in this example, two segmental longitudinal parts 5. Each of these two segmental longitudinal parts 5 is made of an elastic material, compared with the inflexible material used for the transit-unit 1. The segmental longitudinal parts 5 are preferably made of a silicone rubber, preferably with a Shore A hardness of about 72°. The outer plug 15 has an inside 6 which is provided with a second profile 7.

To reduce the possibility of galvanic corrosion, the transit-unit 1 is preferably made of an inert material, i.e. a non-metal and/or non-corrosive material. The material is preferably "dirt-repellent" and/or easily cleaned, so that just before use any sand can be wiped off, and such or similar potential sources for leakages can be removed. For a long life time, the material is preferably a high durability material.

High molecular density polyethylene would be a good choice for the inflexible material of the transit-unit 1. This would also ensure that the material used for the transit-unit is relatively light, advantageous for the use on board of vessels.

As shown, the second profile 7 comprises in this example a number of radially inwardly extending ribs 12, of which each extends in the circumferential direction.

In FIG. 2, the outer plug 15 partly surrounds the transit-unit 1 at the outer circumference 3. One of the two segmental longitudinal parts 5 is positioned against the outer circumference 3 of the transit-unit 1. The other segmental longitudinal part 5 is still at some distance from the outer circumference 3 of transit-unit 1 but, as indicated by arrow A, can be moved more closely to the outer circumference 3 of transit-unit 1 so that at the outer circumference 3 the transit-unit is virtually fully surrounded by the outer plug 15. Once the outer plug 15 surrounds the transit-unit 1 at the outer circumference 3 to the extent that each of the segmental longitudinal parts is placed with its inside against the outer circumference and so that the first and second profiles 4, 7 match each other, the assembly is said to be in an assembled condition. The outer plug 15 can also be said to have a longitudinal direction which coincides with the longitudinal direction of the transit-unit 1 when the assembly is in the assembled condition.

FIG. 3 shows the outer circumference 3 of transit-unit 1 as well as its first profile 4. The first profile 4 comprises in this example a number of radially outwardly extending ribs 11 of which each extends in the circumferential direction. A part of the outer plug 15, namely the second profile 7 at the inside 6 of the outer plug 15, is also shown. Purely for the sake of clarity, a tiny gap is shown between the outer circumference 3 of transit-unit 1 and the inside 6 of segmental longitudinal part 5 of the outer plug 15. This gap more clearly enables the form of the first profile 4 and the form of the second profile 7 to be shown. It is clear that the first profile 4 and the second profile 7 match such that movement of transit-unit 1 relative to the outer plug 15 would be inhibited in the longitudinal direction L if the first profile 4 and the second profile 7 would truly have contact. As clearly shown, in this example that would be contact over the entire circumference 3 with the inside 6 of segmental longitudinal part 5 of the outer plug 15. However, although such complete contact over the entire outer circumference 3 of transit-unit 1 is certainly advantageous, it is conceivable that in other embodiments there is not contact over the entire outer circumference, even though still the first profile 4 and the second profile 7 are also for other such embodiments considered to be matching such that movement of transit-unit 1 relative to the outer plug 15 is inhibited in the longitudinal direction L.

As shown in the example of FIG. 3, in the assembled condition the positions of the inwardly extending ribs 12 and the outwardly extending ribs 11 alternate each other in the longitudinal direction. Below, examples of each of the first and second profiles will be dealt with in more detail, particularly with reference to earlier published descriptions of such profiles. Whereas FIG. 3 only shows parts of the inside 6 of segmental longitudinal part 5, a perspective view of an example of such a segmental longitudinal part 5 is presented in FIG. 4.

It is pointed out that FIGS. 4, 5 and 6 of the present application correspond respectively to FIGS. 4, 1 and 5A of WO 2007/028443 (incorporated herein by reference). The reference signs shown in FIGS. 4, 5 and 6 of the present application correspond to those used in the description of WO 2007/028443 A1.

Consequently, for a more detailed description of an example of profile 7 of an outer plug 15 as presented in FIG. 4 of the present application, reference is made to WO 2007/028443 A1 as that outer profile is very suitable for an outer plug 15 in the presently described invention. The second profile 7 depicted in FIGS. 4, 5 and 6 is according to the prior art used for providing annular contact surfaces against an outer cylindrical surface of a cable, pipe or duct, which is normally smooth. The second profile 7 as shown in FIGS. 4-6, is particularly suitable for sliding in a longitudinal direction over such an outer surface of a pipe, cable or duct as needed when the plug is inserted for sealing. Strikingly, the very same profile can, in combination with a matching counter profile, sufficiently inhibit sliding in a longitudinal direction. Instead of sliding, it provides a firm grip on a matching counter profile. Making use of the very same profile for an outer plug 15 in an assembly according to the present invention has the advantage that for developing the assembly no new outer plugs 15 will have to be designed. It is believed that such a profile 7 works well as it provides a relatively large surface area that can be in contact with profile 4 of the outer circumference 3 of the transit unit 1.

The outer plug 15 is provided with an outside having a number of outer ribs (in FIGS. 4, 5 and 6 labelled 3,11). In the example shown, these ribs 3, 11 have the shape of a sawtooth. The tops (in FIGS. 4, 5 and 6 labelled 8a) are spaced apart in the longitudinal direction for realizing, in use of the assembly, annular contact surfaces closed upon themselves in circumferential direction for sealing contact with an inner wall of the opening.

The thickness of the segmental longitudinal parts 5 is in radial direction such that when the outer plug 15 is inserted into the opening and the outer ribs 3, 11 are pressed inwards, the resulting pressure is passed on to the inner profile 7, and if this is provided with inwardly extending ribs 12, also onto these ribs. As a consequence, the inner profile 7 of the outer plug 15 is pressed onto the outer profile 4 of the outer circumference 3 of the transit-unit 1. The grip of the outer plug 15 on the transit-unit 1 is therefore strong, holding the transit-unit in place. In a practical embodiment, the radial thickness of the outer plug 15 is preferably between 10 and 22 mm, more preferably ranges from 12 to 20 mm. On the basis of routine experiments, a skilled person will be able to determine the optimal difference, in relation to the materials and mechanical properties thereof as selected for the transit-unit and the outer plug.

The outer plug 15 is provided with a flange 13. It should be understood that the segmental longitudinal parts 5 are ideally prepared by an injection moulding process or a compression moulding process, in which a vulcanizable material, possibly on the basis of silicone, is injected into a mould or compressed in a mould, and vulcanized. The use of a known profile for the inside 6 and a known profile for the outside of outer plug 15 in the present invention significantly reduces the need for a new mould, and keeps the costs for the presently described system indeed at a very low level.

FIG. 7 shows the assembly in the assembled condition, i.e. the outer plug 15 as formed by the two segmental longitudinal parts 5 surrounds the transit-unit 1 at the outer circumference 3. Although the segmental longitudinal parts 5 are positioned relative to the transit-unit 1 so that the first profile 4 and the second profile 7 match such that movement of transit-unit 1 relative to the outer plug 15 is inhibited in the longitudinal direction, the assembly, shown in FIG. 7, is not in an installed condition. That is, the assembly as shown in FIG. 7 has not been inserted into an opening for being subjected to a condition wherein the transit-unit is clamped in the opening by the outer plug 15. It follows that the assembly as shown in FIG. 7 is free from radial compression. As can be seen in FIG. 7, the two segmental longitudinal parts 5 do not abut each other in a circumferential direction. The at least two segmental longitudinal parts 5 do thus not form an outer plug 15 which is fully closed in itself in the circumferential direction.

Should the transit-unit 1 not have been positioned between the two segmental longitudinal parts 5, it would then be possible to assemble the outer plug 15 such that the at least two segmental longitudinal parts 5 form an outer plug 15 which is closed in itself in the circumferential direction. Another way of describing the above is to say that in the non-assembled condition of the assembly and an assembled condition of the outer plug 15 in which the outer plug 15 is free from radial compression, a total length of the inside 6 of the outer plug 15 measured in circumferential direction is at each position along the longitudinal direction smaller than the total length of the outer circumference 3 of the transit-unit 1 at the corresponding position along the longitudinal direction. From the embodiment shown in FIG. 7, it is clear that if the two segmental longitudinal parts 5 were to be put in the assembled condition such that the outer plug 15 is closed in itself in the circumferential direction, then transit-unit 1 would not fit in that outer plug 15.

Another way of describing the relative dimensions of the transit-unit and the outer plug 15 in a non-assembled condition of the assembly and in an assembled condition of the outer plug 15, is as follows. At each position along the longitudinal direction the diameter of the inside of the outer plug 15 is smaller than the diameter of the outer circumference 3 of the transit-unit 1 at the corresponding position along the longitudinal direction. As an example, for a transit-unit having a circular cross-section along the transverse direction, and a diameter of say 160 mm, the diameter of the outer plug 15 at corresponding positions along the longitudinal direction, is typically 159 mm (the outer plug 15 is in the assembled condition and the assembly is in the non-assembled condition). This difference in diameter of 1 mm may be slightly more or slightly less. On the basis of routine experiments, a skilled person will be able to determine the optimal difference.

Looking again at FIG. 3, it is clear that as a result of the first profile 4 and the second profile 7 comparisons as described above only make sense if these apply to corresponding positions along the longitudinal direction L at the circumference 3 of the transit-unit 1 and along the inside 6 of the outer plug 15. Corresponding positions are to be seen as positions which would have contact when the assembly is in the assembled condition, and the first and second profiles match each other such that movement of the transit-unit relative to the outer plug 15 is inhibited in the longitudinal direction.

FIG. 8 shows the assembly as put in the assembled position and as put in the installed condition. The assembled assembly has been inserted into the end of a pipe 8 so that the transit-unit 1 is held in a clamped position by the outer plug 15. The two segmental longitudinal parts 5 of the outer plug 15 now abut each other at both possible positions for such abutment so that in circumferential direction the outer plug 15 is closed in itself. Clearly, the inner diameter of the outer plug 15 now corresponds to the outer diameter of the transit-unit 1, at the corresponding positions along the longitudinal direction L. Likewise, a total length of the inside of the outer plug 15 measured in circumferential direction is now equal to the total length of the outer circumference of the transit-unit 1, at corresponding positions along the longitudinal direction. Preferably, profile 4 of the outer circumference 3 of the transit-unit 1 has a smooth surface, allowing for optimal sliding of the outer plug 15 along the circumferential direction as might occur during insertion and the accompanying radial compression of the outer plug 15, as described above. The outer plug 15 is preferably made of silicon rubber having a Shore A hardness ranging from 65° up to 75°, preferably 68°-70°, and even more preferably about 72°.

FIG. 9 shows a cross-section of a transit-unit 1, taken along the longitudinal direction L thereof. Each conduit 2 is seen to have a restricted part 9. The example shown is seen to have two conduits 2. However, it is of course equally possible that the transit-unit has only one conduit 2, or a much larger number of conduits 2. In the examples shown, the restricted part 9 is formed by a part of the conduit 2 that has a diameter which is smaller than the diameter of an unrestricted part of the conduit 2. This can also be seen in FIGS. 7 and 8. An entrance of the unrestricted part of each conduit 2 has preferably a rim which is rounded-off, so as not to have a sharp edge which could damage the inner plug 16 on insertion into the conduit 2.

Although it is shown that the transit-unit 1, comprising one or a plurality of conduits 2 of which each has a restricted part 9, can be a one piece object, it is equally possible that the restricted part 9 is formed by a part which is mounted towards one end of an unrestricted part of conduit 2. It is for instance possible that the transit-unit 1 is a multiple-part device, having at least one part in which the conduits are unrestricted and another part which effectively lengthens the conduits and therewith adds on a restricted part of the conduits. Once this insight is put to a person skilled in the art, a large number of possibilities for realising such embodiments will spring to mind of that person.

FIGS. 10, 11 and 12 correspond respectively to FIGS. 2, 3 and 4 of WO 2008/023058 A1 (incorporated herein by reference). FIG. 10 shows one segment of a segmented inner plug 16. FIG. 11 of the present application shows a view onto the inside of such an inner plug 16 and FIG. 12 shows in more detail a cross-section taken along a longitudinal direction of such an inner plug 16.

The reference signs used in FIGS. 10, 11 and 12 of the present application correspond to those used in the description of WO 2008/023058 A1. For a detailed description of this example of an inner plug 16, reference is therefore made to that prior art document. Here, we merely point out that preferably, as shown, each of the inner plugs 16 is free from a flange. In an advantageous embodiment, each of the inner plugs 16 has a length such that the entire inner plug 16 fits in the restricted part of the respective conduit 2. This means that a distribution of the conduits is determined by the dimension of the conduits 2 and the necessary thickness of the material between these conduits 2. The dimensions of the inner plugs 16 do not play a role in the distribution of the conduits 2 over the transit-unit 1. That is because each inner plug 16 fits in its entirety in a conduit, so that only the conduit itself has to be taken into account for designing the transit-unit in a way that the conduits are advantageously distributed over the transit-unit.

Furthermore, it is possible for the inner plugs 16 to be pressed in a longitudinal direction toward the unrestricted part 9 of the conduit 2. This allows for a form of "dynamic sealing", meaning that the sealing improves as the pressure difference over the length of the plug increases. For a more detailed description of this mechanism, reference is made to WO 2008/023058. It is stressed here that the present invention is not specifically directed to such dynamic sealing.

The function of the inner plugs 16 is to clamp the pipe, cable 10 or duct effectively to the transit-unit 1, so that the transit-unit 1 is held in place by the clamping of the outer plug 15 and the clamping to each of the cables 10, pipes or ducts extending through the transit-unit. It follows that the overall clamping is better if the number of conduits is higher.

FIG. 13 shows an example in perspective view of an inner plug 13 which could seal space within a conduit 2 that remains when three cables extend through that conduit 2.

FIG. 14 shows an example of an inner plug 14 which can be used in a conduit 2 through which, for the time being, no cable, pipe or duct extends. This is often referred to as a blind plug. It is possible that the assembly as initially installed in an opening is only provided with blind plugs 14. It can even be installed in a factory where a pre-fabricated wall is prepared for transport to a construction site. This has the advantage that each conduit 2, or at least the unrestricted part thereof, remains free from dirt until the blind plug is removed for passing a cable through the conduit and inserting an inner plug 16. FIG. 13 and FIG. 14 correspond to respectively FIG. 17 and FIG. 18 of WO 2008/023058 A1, to which the reader is referred for a further description of these type of plugs.

FIGS. 15, 16 and 17 show schematically cross-sections taken along a transverse direction of alternative inner plugs 16 which could equally be part of an assembly according to the invention for insertion into one of the conduits 2 of transit-unit 1. Advantageously, of such plugs, only one segment needs to be replaced should a pipe, cable or duct with another diameter than for which the present inner plug 16 is suitable, be passed through the conduit 2. FIGS. 15, 16 and 17 correspond respectively to FIGS. 1A, 1B and 1C respectively of international patent application POT/EP2010/050986 (incorporated herein by reference), to which the reader is referred for more details about these examples of inner plugs 16. Other examples are also described in GB 2171139A (incorporated herein by reference). Particularly those shown in FIGS. 5-8 thereof can suitably be employed in an assembly according to the invention.

FIG. 18 shows various intermediate stages reached by carrying out steps of a method for providing in an opening a sealing system through which at least one cable, pipe or duct extends. The method entails providing an assembly as described above. In detail, the method comprises providing a transit-unit, for instance a transit-unit 1 as described above, of a relatively inflexible material, which could be a high-density polyethylene. The transit-unit 1 comprises in this example a number of conduits 2 extending in a longitudinal direction of the transit-unit 1. Each conduit 2 is suitable for receiving one cable, pipe or duct. The transit-unit has an outer circumference which is provided with a first profile (not shown in FIG. 18). The method further comprises providing an outer plug 15 comprising at least two segmental longitudinal parts 5 which are of an elastic material relative to the inflexible material of transit-unit 1. The outer plug 15 has an inside (not shown in FIG. 18) which is provided with a second profile (not shown in FIG. 18).

FIG. 18(*a*) shows the transit-unit 1 and the outer plug 15 in an assembled condition as a result of putting the outer plug 15 and the transit-unit 1 such that the outer plug 15 is positioned so as to surround the transit-unit 1 at the outer circumference. The arrows shown in FIG. 18(*a*) indicate a movement of the assembled assembly into the opening. As a result of inserting the outer plug 15 and the transit-unit 1 in the assembled condition into the opening is that the transit-unit 1 is clamped in the opening by the outer plug 15, as shown in FIG. 18(*b*). FIG. 18(*b*) also shows the result of another method step, namely passing a cable 10 through one of the conduits 2. In case there is a plurality of cables 10, pipes or ducts, these will then be passed through the plurality of conduits 2.

The method also comprises providing for each of the conduits 2 a segmented inner plug 16 of an elastic material, compared with the inflexible material of the transit-unit 1. An example of such a plug, and more details thereof, are shown in FIGS. 10-17 and described in the accompanying description thereof, and even in more detail described in documents referred to herein above. FIG. 18(*d*) shows a step of inserting in a conduit 2 one of the segmented inner plugs 16 for sealingly filling a space in the respective conduit 2 between an inner circumferential wall of the conduit 2 and the cable 10. FIG. 18(*e*) shows the end result of that step. FIG. 18(*f*) shows the result after repeating the steps of passing a cable through a conduit and inserting in that conduit one of the segmented inner plugs 16 for sealingly filling a space in that conduit 2 between an inner circumferential wall of the conduit 2 and the cable 10 passed through that conduit 2. FIG. 18(*g*) shows an end result of an embodiment of such a method according to the invention. It is to be noted that one of the conduits 2*a* is in this example only provided with a blind segmented inner plug 14, leaving that conduit 2 available for use in the future.

Clearly, the method can be carried out with an assembly as described above with reference to FIGS. 1-17.

It is mentioned that for a relatively easy way of inserting the assembled assembly into the opening and of inserting an inner plug 16 for sealingly filling a space in a conduit 2, the respective plug is just before insertion ideally provided with a lubricant, such as vaseline.

FIG. 19 shows in a perspective and semi-exploded view an opening into which at each end of the opening an assembly according to the invention is provided, using a method as described above. Clearly, the assembly can be provided such that a variety of cables, pipes or ducts can be passed through the opening in a way that the opening is neatly sealed off.

Although not shown, it is pointed out that the entire assembly could also be put in an opening which itself is a conduit 2 in another, much larger, transit-unit 1. In other words, an embodiment of an assembly according to the invention can easily be scaled up and another embodiment of an assembly according to the invention can easily be scaled down. The down-scaled embodiment could be put in a conduit of the up-skilled embodiment.

Even in the simplest application of the invention, wherein the assembly is used for sealing an opening in a wall or an opening formed by a conduit sleeve (not part of another transit-unit), the sealing can exhibit some flexibility in the longitudinal direction. Within each conduit 2 the plug can be compressed in the longitudinal direction, particularly when the conduit comprises the above-described restricted part. However, also the transit-unit is somewhat flexibly suspended in the opening by the clamping function of the outer plug 15. This equally applies to the transverse direction. A slight movement of the cable in the transverse direction can initially be absorbed by the elastic inner plug 16, particularly if that is one as described above. However, also the entire transit-unit 1 is suspended flexibly with respect to the transverse direction.

The invention is not limited to the embodiment shown above. Many variations and modifications can be made.

In the example above the transit-unit is shown as cylindrical. Also elliptical and/or slightly conical transit-units can be used. The outer plug 15 can have a corresponding inside. Also the shape of the opening can differ from a cylindrical configuration. Rectangular openings, possibly with rounded corners may also be provided with an assembly according to the invention. The outer plug and the transit-unit will then have dimensions which accommodate for instalment in such an opening. The conduits may for such an embodiment still be cylindrical.

The first and second profile can be such that their mechanical interplay, i.e. the keying function, is more pronounced. In such an embodiment the outer plug 15, particularly the inside thereof, might need to be designed exclusively for use in an assembly according to the invention.

The transit-unit may be provided with a locker plate, which could be screwed against the transit-unit so as to lock the inner plugs 16 in their respective conduits. Such a locker plate can form the restrictive parts but also be in addition to the restrictive parts of the conduit and at a side of the conduit opposite the side having the restricted part. When a locker place is applied at an end of the conduit that is opposite the end that has the restrictive part, then the inner plug 16 is locked-in inside the transit-unit, ensuring that it cannot be pushed out of the transit-unit in case at one side of the transit-unit a very high pressure is reached. For such embodiments, it might be recommendable to have a first and second profile which more intensively interact, for instance by having a greater radial overlap.

The sealing as provided with a method according to the invention and/or with use of an assembly according to the invention will be watertight, can sustain a pressure difference between one side of the opening and the other side, and can be fire-resistant, particularly if the materials for both the transit-unit 1 and the outer and inner plugs are selected for that purpose. The transit-unit 1 can be made of a fire-resistant rubber, just as the outer plug and the inner plugs. However, the transit-unit 1 would then preferably have a Shore A hardness of about 90°.

These embodiments are all understood to fall within the framework of the invention, as defined by the independent claims.

The invention claimed is:

1. A sealing assembly for providing a sealing in an opening through which at least one cable, pipe or duct extends, the assembly comprising:
   a transit-unit of a relatively inflexible material, wherein the transit-unit comprises at least one conduit extending in a longitudinal direction of the transit-unit, wherein the conduit is adapted to receive at least one of the at least one cable, pipe or duct, the transit-unit having an outer circumference having a first profile; and
   an outer plug comprising at least two segmental longitudinal parts comprising a relatively elastic material as compared with the inflexible material of the transit-unit, wherein the outer plug has an inside having a second profile;
   wherein, in an assembled condition of the assembly, the outer plug surrounds the transit-unit at the outer circumference thereof, wherein, in the assembled condition, the first profile and the second profile match each other such that movement of the transit-unit relative to the outer plug is inhibited in opposing first and second directions along the longitudinal direction.

2. An assembly according to claim 1, wherein, in a non-assembled condition of the assembly and in an assembled condition of the outer plug in which the outer plug is free from radial compression, a total length of the inside of the outer plug measured in a circumferential direction is at each position along the longitudinal direction smaller than the total length of the outer circumference of the transit-unit at the corresponding position along the longitudinal direction.

3. An assembly according to claim 1, wherein, in a non-assembled condition of the assembly and in an assembled condition of the outer plug in which the outer plug is free from radial compression, at each position along the longitudinal direction, the diameter of the inside of the outer plug is smaller than the diameter of the outer circumference of the transit-unit at the corresponding position along the longitudinal direction.

4. An assembly according to claim 1, wherein the conduit includes an unrestricted part and a restricted part which are next to each other in the longitudinal direction.

5. An assembly according to claim 4, wherein the assembly further comprises for the conduit a segmented inner plug comprising a relatively elastic material as compared with the inflexible material of the transit-unit, adapted to sealingly fill a space in the unrestricted part of the conduit between an inner circumferential wall of the conduit and at least one of the at least one cable, pipe or duct.

6. An assembly according to claim 5, wherein the inner plug further comprises a length such that the entire inner plug fits in the unrestricted part of the conduit.

7. An assembly according to claim 4, wherein the assembly further comprises an inner plug, wherein the inner plug is free of a flange.

8. An assembly according to claim 1, wherein the outer plug comprises a flange.

9. An assembly according to claim 1, wherein the first profile comprises a number of radially outwardly extending ribs each extending in a circumferential direction.

10. An assembly according to claim 1, wherein the second profile comprises a number of radially inwardly extending ribs each extending in a circumferential direction.

11. An assembly according to claim 1, wherein the first profile comprises a number of radially outwardly extending ribs each extending in a circumferential direction and wherein the second profile comprises a number of radially inwardly extending ribs each extending in the circumferential direction, wherein, in the assembled condition, the positions of the inwardly extending ribs and the outwardly extending ribs alternate each other in the longitudinal direction.

12. An assembly according to claim 1, wherein the outer plug includes an outside having a number of outer ribs wherein tops of the outer ribs are spaced apart in the longitudinal direction for realizing, in use of the assembly, annular contact surfaces closed upon themselves in a circumferential direction for sealing contact with an inner wall of the opening.

13. A method for providing a sealing system in an opening through which at least one cable, pipe or duct extends, the method comprising:
  providing a transit-unit of a relatively inflexible material, wherein the transit-unit comprises at least one conduit extending in a longitudinal direction of the transit-unit, wherein the at least one conduit is adapted to receive at least one of the at least one cable, pipe or duct, the transit-unit having an outer circumference which is provided with having a first profile;
  providing an outer plug comprising at least two segmental longitudinal parts comprising a relatively elastic material as compared with the inflexible material of the transit-unit, wherein the outer plug has an inside having a second profile; and
  providing for the at least one conduit a segmented inner plug comprising an elastic material as compared with the inflexible material of the transit-unit, adapted to sealingly fill a space in the at least one conduit between an inner circumferential wall of the at least one conduit and the at least one of the at least one cable, pipe or duct;
wherein, in an assembled condition the outer plug surrounds the outer circumference of the transit-unit, wherein, in the assembled condition, the first and second profiles match each other such that movement of the transit-unit relative to the outer plug is inhibited in opposing first and second directions along the longitudinal direction,
the method further comprising:
  putting the outer plug and the transit-unit in the assembled condition by positioning the outer plug such that it surrounds the transit-unit at the outer circumference;
  inserting the outer plug and the transit-unit in the assembled condition into the opening so that the transit-unit is clamped in the opening by the outer plug;
  passing the at least one of the at least one cable, pipe or duct through the at least one conduit;
  inserting in the at least one conduit the segmented inner plug for sealingly filling a space in the at least one conduit between an inner circumferential wall of the at least one conduit and the at least one of the at least one cable, pipe or duct extending therethrough.

14. A method according to claim 13, further comprising:
  providing the outer plug such that in the assembled condition and in a non-installed condition in which the assembly is free from radial compression, a total length of the inside of the outer plug measured in circumferential direction is at each position along the longitudinal direction smaller than the total length of the outer circumference of the transit-unit at the corresponding position along the longitudinal direction.

15. A method according to claim 13, wherein the opening is a conduit in a transit-unit.

16. An assembly according to claim 1, wherein the at least one conduit comprises a plurality of conduits, wherein each conduit is adapted to receive at least one of the at least one cable, pipe or duct.

17. An assembly according to claim 16, wherein each conduit includes an unrestricted part and a restricted part which are next to each other in the longitudinal direction.

18. An assembly according to claim 17, further comprising a plurality of segmented inner plugs, each for one of the at least one conduit, each segmented inner plug comprising a relatively elastic material as compared with the inflexible material of the transit-unit, each segmented inner plug adapted to sealingly fill a space in the unrestricted part of the at least one conduit between an inner circumferential wall of the at least one conduit and at least one of the at least one cable, pipe or duct.

19. An assembly according to claim 16, further comprising a plurality of segmented inner plugs each for one of the at least one conduit, each inner plug has a length such that the entire inner plug fits in the unrestricted part of the respective conduit.

20. An assembly according to claim 16, further comprising a plurality of segmented inner plugs each for one of the conduits, wherein each inner plug is free of a flange.

21. A method according to claim 13, wherein providing a transit-unit comprises providing a transit-unit with a plurality of conduits, each adapted to receive at least one of the at least one cable, pipe or duct; wherein providing for the at least one conduit a segmented inner plug comprises providing for each conduit a segmented inner plug: wherein passing the at least one cable, pipe or duct through the at least one conduit comprises passing at least one of the at least one cable, pipe or duct through each conduit; and wherein inserting in the at least one conduit the segmented inner plug comprises inserting in each conduit a segmented inner plug for sealingly filling a space in the respective conduit between the inner circumferential wall of the respective conduit and at least one of the at least one cable, pipe or duct extending therethrough.

* * * * *

UNITED STATES PATENT AND TRADEMARK OFFICE
CERTIFICATE OF CORRECTION

PATENT NO. : 10,422,427 B2  
APPLICATION NO. : 13/699189  
DATED : September 24, 2019  
INVENTOR(S) : Johannes Alfred Beele Page 1 of 1

It is certified that error appears in the above-identified patent and that said Letters Patent is hereby corrected as shown below:

On the Title Page

In item (30) "Foreign Application Priority Data" please replace "10163749" with --10163749.4--

Signed and Sealed this  
Seventeenth Day of November, 2020

Andrei Iancu  
*Director of the United States Patent and Trademark Office*